United States Patent
Smartt et al.

(10) Patent No.: US 10,078,338 B2
(45) Date of Patent: Sep. 18, 2018

(54) DEVICES, SYSTEMS, AND METHODS FOR REMOTE AUTHORIZATION OF AUTONOMOUS VEHICLE OPERATION

(71) Applicant: Peloton Technology, Inc., Mountain View, CA (US)

(72) Inventors: Brian E. Smartt, Los Gatos, CA (US); Charles A. Price, Los Altos, CA (US); Joshua P. Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

(21) Appl. No.: 15/904,415

(22) Filed: Feb. 25, 2018

(65) Prior Publication Data
US 2018/0210457 A1    Jul. 26, 2018

Related U.S. Application Data

(63) Continuation-in-part of application No. PCT/US2016/049143, filed on Aug. 26, 2016.
(Continued)

(51) Int. Cl.
*B60W 40/12* (2012.01)
*G01C 21/32* (2006.01)
(Continued)

(52) U.S. Cl.
CPC ......... *G05D 1/0285* (2013.01); *G05D 1/0088* (2013.01); *G05D 1/0297* (2013.01); *H04L 67/12* (2013.01); *G05D 2201/0213* (2013.01)

(58) Field of Classification Search
CPC ...... G05D 1/0285; G05D 1/0038; G05D 1/00; G08G 1/096716; G08G 1/16;
(Continued)

(56) References Cited

U.S. PATENT DOCUMENTS 5,331,561 A    7/1994  Barrett et al.
5,572,449 A    11/1996 Tang et al.
(Continued)

FOREIGN PATENT DOCUMENTS

DE    102014013672 A1 *  4/2015  ............... G05D 1/00
EP    0991046 B1         3/2005
(Continued)

OTHER PUBLICATIONS

Browand, Fred et al,, "Fuel Saving Achieved in the Field Test of Two Tandem Truck," California PATH Research Report UCB-ITS-PRR-2004-20, Jun. 2004, 29 pages.
(Continued)

*Primary Examiner* — Yuri Kan
(74) *Attorney, Agent, or Firm* — Singularity LLP

(57) ABSTRACT

Systems and methods for coordinating and controlling vehicles, for example heavy trucks, to follow closely behind each other, or linking to form a platoon. In one aspect, on-board controllers in each vehicle interact with vehicular sensors to monitor and control, for example, relative distance, relative acceleration or deceleration, and speed. In some aspects, vehicle onboard systems supply various data (breadcrumbs) to a Network Operations Center (NOC), which in turn provides data (authorization data) to the vehicles to facilitate platooning. The NOC suggests vehicles for platooning based on, for example, travel forecasts and analysis of relevant roadways to identify platoonable roadway segments. The NOC also can provide traffic, roadway, weather, or system updates, as well as various instructions. In some aspects, a mesh network ensures improved communication among vehicles and with the NOC. In some aspects, a vehicle onboard system may provide the authorization data.

29 Claims, 31 Drawing Sheets

Related U.S. Application Data

(60) Provisional application No. 62/377,970, filed on Aug. 22, 2016, provisional application No. 62/363,192, filed on Jul. 15, 2016, provisional application No. 62/343,819, filed on May 31, 2016, provisional application No. 62/249,898, filed on Nov. 2, 2015, provisional application No. 62/210,374, filed on Aug. 26, 2015, provisional application No. 62/531,293, filed on Jul. 11, 2017.

(51) Int. Cl.
*G05D 1/02* (2006.01)
*H04L 29/08* (2006.01)
*G05D 1/00* (2006.01)

(58) Field of Classification Search
CPC ..... B61L 15/0027; G06Q 50/28; G01C 21/32; B60W 40/12
See application file for complete search history.

(56) References Cited

U.S. PATENT DOCUMENTS

| | | | |
|---|---|---|---|
| 5,680,122 A | 10/1997 | Mio | |
| 6,032,097 A | 2/2000 | Iihoshi et al. | |
| 6,125,321 A | 9/2000 | Tabata et al. | |
| 6,128,559 A | 10/2000 | Saitou et al. | |
| 6,188,950 B1 | 2/2001 | Tsutsumi et al. | |
| 6,265,990 B1 | 7/2001 | Isogai et al. | |
| 6,356,820 B1 | 3/2002 | Hashimoto et al. | |
| 6,418,370 B1 | 7/2002 | Isogai et al. | |
| 6,484,078 B1 | 11/2002 | Kageyama | |
| 6,510,381 B2 | 1/2003 | Grounds et al. | |
| 6,879,910 B2 | 4/2005 | Shike et al. | |
| 6,963,795 B2 | 11/2005 | Haissig et al. | |
| 7,286,825 B2 | 10/2007 | Shishido et al. | |
| 7,554,435 B2 | 6/2009 | Tengler et al. | |
| 7,593,811 B2 | 9/2009 | Schmidt et al. | |
| 7,729,823 B2 | 6/2010 | Ruoppolo | |
| 7,894,982 B2 | 2/2011 | Reeser et al. | |
| 8,026,833 B2 | 9/2011 | Villaume et al. | |
| 8,073,574 B2 | 12/2011 | Yamamoto et al. | |
| 8,116,921 B2 | 2/2012 | Ferrin et al. | |
| 8,139,109 B2 | 3/2012 | Schmiedel et al. | |
| 8,224,551 B2 | 7/2012 | Grolle et al. | |
| 8,275,491 B2 | 9/2012 | Ferrin et al. | |
| 8,326,473 B2 | 12/2012 | Simpson et al. | |
| 8,352,111 B2 | 1/2013 | Mudalige | |
| 8,352,112 B2 | 1/2013 | Mudalige | |
| 8,442,735 B2 | 5/2013 | Hrovat et al. | |
| 8,538,656 B2 | 9/2013 | Yamashiro | |
| 8,676,466 B2 | 3/2014 | Mudalige | |
| 8,688,349 B2 | 4/2014 | Grolle et al. | |
| 8,738,238 B2 | 5/2014 | Rekow | |
| 8,798,907 B2 | 8/2014 | Shida | |
| 8,947,531 B2 | 2/2015 | Fischer et al. | |
| 9,079,587 B1 | 7/2015 | Rupp et al. | |
| 9,145,137 B2 | 9/2015 | Doi et al. | |
| 9,373,149 B2* | 6/2016 | Abhyanker | G06Q 50/28 |
| 9,423,794 B2 | 8/2016 | Lind et al. | |
| 9,956,964 B2* | 5/2018 | Desnoyer | B60W 40/12 |
| 9,964,948 B2* | 5/2018 | Ullrich | G05D 1/0038 |
| 2002/0077748 A1 | 6/2002 | Nakano | |
| 2002/0152015 A1 | 10/2002 | Seto | |
| 2004/0140143 A1 | 7/2004 | Saeki et al. | |
| 2006/0074557 A1 | 4/2006 | Mulligan et al. | |
| 2006/0095195 A1 | 5/2006 | Nishimura et al. | |
| 2006/0106534 A1 | 5/2006 | Kawamata et al. | |
| 2006/0161341 A1 | 7/2006 | Haegebarth et al. | |
| 2006/0229804 A1 | 10/2006 | Schmidt et al. | |
| 2007/0027614 A1 | 2/2007 | Reeser et al. | |
| 2007/0060045 A1 | 3/2007 | Prautzsch | |
| 2007/0213915 A1 | 9/2007 | Tange et al. | |
| 2007/0233337 A1 | 10/2007 | Plishner | |
| 2007/0276597 A1 | 11/2007 | Kato et al. | |
| 2008/0009985 A1 | 1/2008 | Plishner | |
| 2008/0059007 A1 | 3/2008 | Whittaker et al. | |
| 2008/0249667 A1 | 10/2008 | Horvitz et al. | |
| 2009/0012666 A1 | 1/2009 | Simpson et al. | |
| 2009/0062974 A1 | 3/2009 | Tamamoto et al. | |
| 2009/0079839 A1 | 3/2009 | Fischer et al. | |
| 2009/0157461 A1 | 6/2009 | Wright et al. | |
| 2009/0164082 A1 | 6/2009 | Kobayashi et al. | |
| 2009/0222186 A1 | 9/2009 | Jensen | |
| 2010/0049374 A1 | 2/2010 | Ferrin et al. | |
| 2010/0250088 A1 | 9/2010 | Grolle et al. | |
| 2010/0256835 A1 | 10/2010 | Mudalige | |
| 2010/0256836 A1 | 10/2010 | Mudalige | |
| 2010/0256852 A1 | 10/2010 | Mudalige | |
| 2010/0332101 A1 | 12/2010 | Braunberger et al. | |
| 2011/0010022 A1 | 1/2011 | Beavin | |
| 2011/0083011 A1 | 4/2011 | DiCrescenzo | |
| 2011/0112730 A1 | 5/2011 | Rekow | |
| 2011/0184605 A1 | 7/2011 | Neff | |
| 2011/0222730 A1 | 9/2011 | Steinberg et al. | |
| 2011/0270514 A1 | 11/2011 | Shida | |
| 2011/0270520 A1 | 11/2011 | Kronenberg | |
| 2012/0259516 A1 | 10/2012 | Grolle et al. | |
| 2013/0024084 A1 | 1/2013 | Yamashiro | |
| 2013/0030606 A1 | 1/2013 | Mudalige et al. | |
| 2013/0080041 A1 | 3/2013 | Kumabe | |
| 2013/0211624 A1 | 8/2013 | Lind et al. | |
| 2013/0317676 A1 | 11/2013 | Cooper et al. | |
| 2014/0303870 A1 | 10/2014 | Switkes et al. | |
| 2014/0309836 A1 | 10/2014 | Ollis | |
| 2015/0153733 A1 | 6/2015 | Ohmura et al. | |
| 2015/0251676 A1* | 9/2015 | Golden | B61L 15/0027 701/19 |
| 2016/0267796 A1 | 9/2016 | Hiroma et al. | |
| 2017/0363430 A1* | 12/2017 | Al-Dahle | G01C 21/32 |

FOREIGN PATENT DOCUMENTS

| | | | | |
|---|---|---|---|---|
| EP | 2390744 A1 | 11/2011 | | |
| JP | 5170008 B2 | 7/1993 | | |
| JP | 2995970 B2 | 12/1999 | | |
| JP | 2010030525 A | 2/2010 | | |
| JP | 5141849 B2 | 2/2013 | | |
| JP | 2014056483 A | * | 3/2014 | B60R 21/00 |
| WO | 2004077378 A1 | 9/2004 | | |
| WO | WO-2010098554 A2 | * | 9/2010 | G08G 1/096716 |
| WO | 2011125193 A1 | 10/2011 | | |
| WO | 2013006826 A2 | 1/2013 | | |
| WO | 2015047174 A1 | 4/2015 | | |

OTHER PUBLICATIONS

Desjardins, Charles, et al., "Cooperative Adaptive Cruise Control: A Reinforcement Learning Approach," IEEE Transactions on Intelligent Transportation Systems, vol. 12, No. 4, pp. 1248-1260, Dec. 2011.

Friedrichs, Andreas et al., "A Generic Software Architecture for a Driver Information System to Organize and Operate Truck Platoons," Conference Paper—May 2008, pp. 250-259.

Gerdes, J.C., et al., "Vehicle Speed and Spacing Control Via Coordinated Throttle and Brake Actuation," Control Eng. Practice, vol. 5, No. 11, pp. 1607-1614, Sep. 1997.

Hellstrom, Magnus, "Engine Speed Based Estimation of the Indicated Engine Torque," Master's thesis performed at Vehicular Systems, Dept. of Electrical Engineering at Linkopings universitet, Feb. 16, 2005, Reg nr: LiTH-ISY-EX-3569-2005, 59 pages.

Korean Intellectual Property Office, ISA, "International Search Report and Written Opinion" in PCT Application No. PCT/US2012/045830, Jan 7, 2013, 9 pages.

Kozan, Recep et al., "An Experimental Approach for Engine Mapping," Modem Applied Science, vol. 3, No. 3, Mar. 2009, pp. 3-9.

Li, Shengbo Eben et al., "Strategies to Minimize Fuel Consumption of Passenger Cars during Car-Following Scenario," 2011 American Control Conference, San Francisco, CA, USA, Jun. 29-Jul. 1, 2011, pp. 2107-2112.

(56) References Cited

OTHER PUBLICATIONS

Michaelian, Mark, et al., "Field Experiments Demonstrate Fuel Savings for Close-Following," California PATH Research Report UCB-ITS-PRR-2000-14, 28 pages, Sep. 2000.

Micheau, Philippe, et al., "Revolution Speed Limiter for Engine Subjected to Large Load Variation," IFAC Advances in Automotive Control, Salerno, Italy, 2004, pp. 221-226.

Nowakowski, Christopher, et al., "Cooperative Adaptive Cruise Control: Testing Drivers' Choices of Following Distances," California PATH Research Report UCB-ITS-PRR-2011-01, 171 pages, Jan. 2011.

Packard, Andrew et al., "Section 5, Simple Cruise Control," ME 132, Dynamic Systems and Feedback, Class Notes, Spring 2005, Instructor Prof. A. Packard, Department of Mechanical Engineering, UC Berkeley, pp. 24-52.

Porche, Isaac R., et al., "Real Time Task Manager for Communications and Control in Multicar Platoons," Proceedings of the Intelligent Vehicles '92 Symposium, pp. 409-414, Jun. 29-Jul. 1, 1992.

U.S. Appl. No. 61/167,121, filed Apr. 6, 2009 (Mudalige).

Ramakers, Richard et al., "Electronically coupled truck platoons on German highways," Proceedings of the 2009 IEEE International Conference on Systems, Man, and Cybernetics, San Antonio, TX, USA—Oct. 2009, pp. 2409-2414.

SAE International, Surface Vehicle Recommended Practice, J1939-71, Mar. 2011, Vehicle Application Layer, 1201 pages.

Sheikholeslam, Shahab, et al., "A System Level Study of the Longitudinal Control of a Platoon of Vehicles," Transactions of the ASME, vol. 114, pp. 286-292, Jun. 1992.

Sheikholeslam, Shahab, et al., "Longitudinal Control of a Platoon of Vehicles," Proceedings of the American Control Conference, May 23-25, 1990, pp. 291-296.

Sheikholeslam, Shahab, et al., "Longitudinal Control of a Platoon of Vehicles; III: Nonlinear Model," UCB Path Report UCB-ITS-PRR-90-1, 25 pages, Apr. 1990.

Shladover, Steven E., "Development and Evaluation of Selected Mobility Applications for VII (a.k.a. IntelliDrive)," California PATH PowerPoint Presentation; available at http://slideplayer.com/slide/6981587/, Jul. 1, 2009; 17 pages.

Shladover, Steven E., et al., "Demonstration of Automated Heavy-Duty Vehicles," California PATH Research Report UCB-ITS-PRR-2005-23, Jun. 2005, 459 pages.

Sugimachi, Toshiyuki et al., "Development of Autonomous Platooning System for Heavy-duty Trucks," Proceedings of the 7th IFAC Symposium on Advances in Automotive Control, The International Federation of Automatic Control, Sep. 4-7, 2013. Tokyo, Japan, IFAC Proceedings Volumes vol. 46, Issue 21, (2013) pp. 52-57.

Tsugawa, Sadayuki, "An Overview on an Automated Truck Platoon within the Energy ITS Project," Proceedings of the 7th IFAC Symposium on Advances in Automotive Control, The International Federation of Automatic Control, Sep. 4-7, 2013. Tokyo, Japan, IFAC Proceedings Volumes vol. 46, Issue 21, (2013) pp. 41-46.

Tsugawa, Sadayuki, et al., "An Automated Truck Platoon for Energy Saving," 2011 IEEE/RSJ International Conference on Intelligent Robots and Systems, pp. 4109-4114, Sep. 25-30, 2011.

Zabat, Michael et al., "The Aerodynamic Performance of Platoons: Final Report," California PATH Research Report UCB-ITS-PRR-95-35, 172 pages, Oct. 1995.

\* cited by examiner

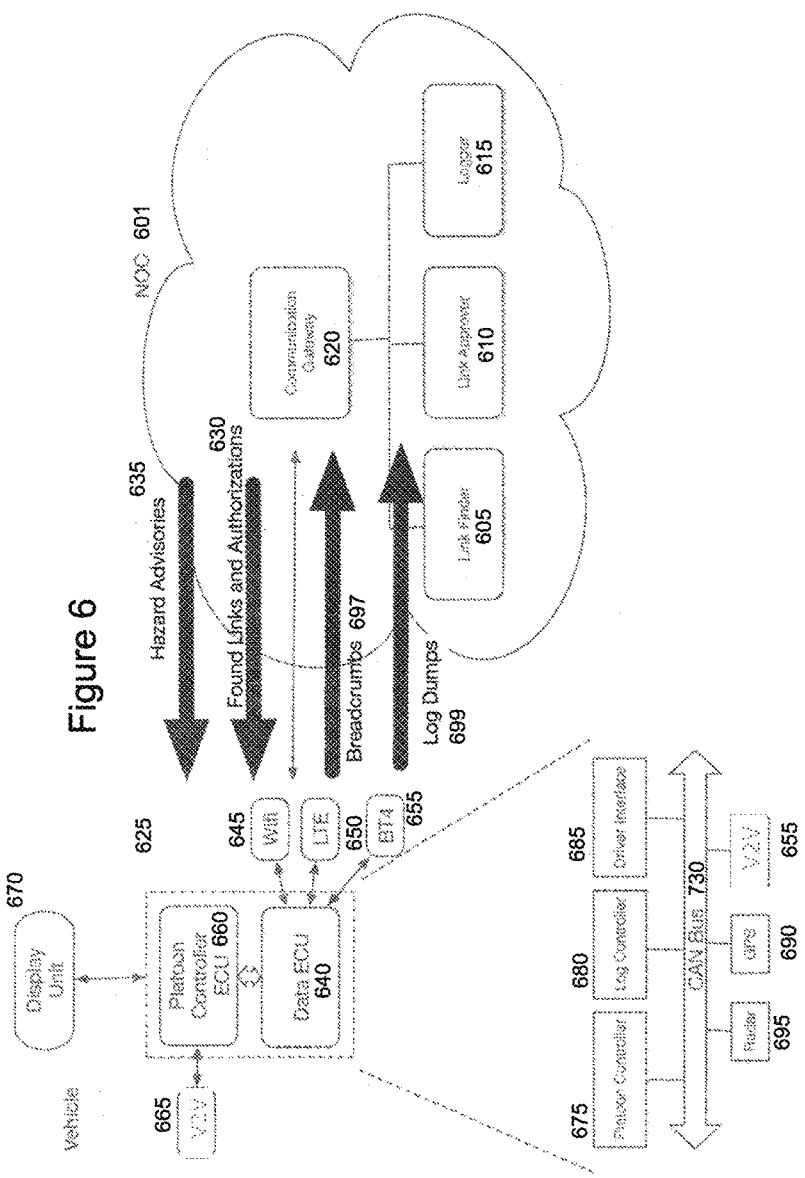

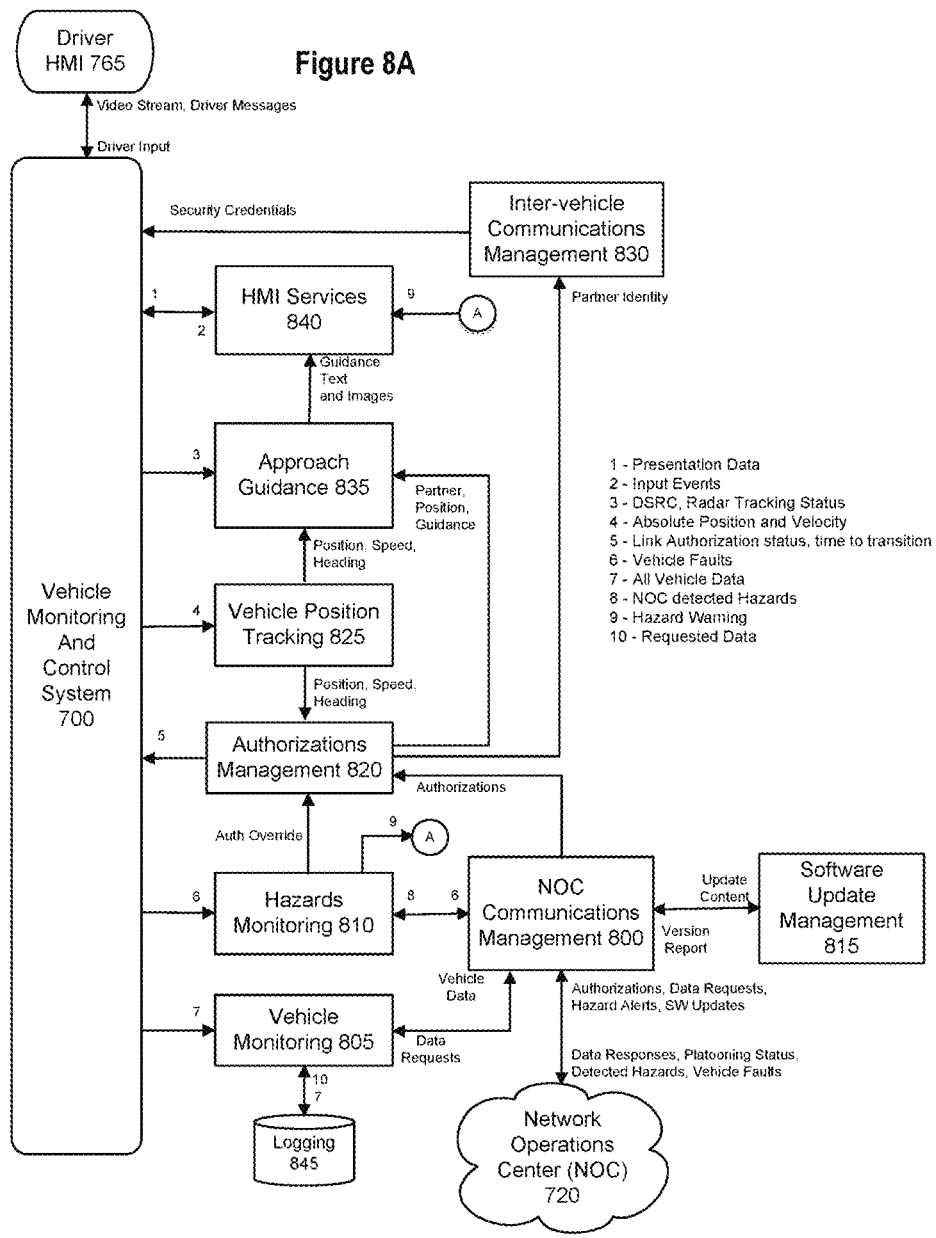

NOC-Truck Connection Management

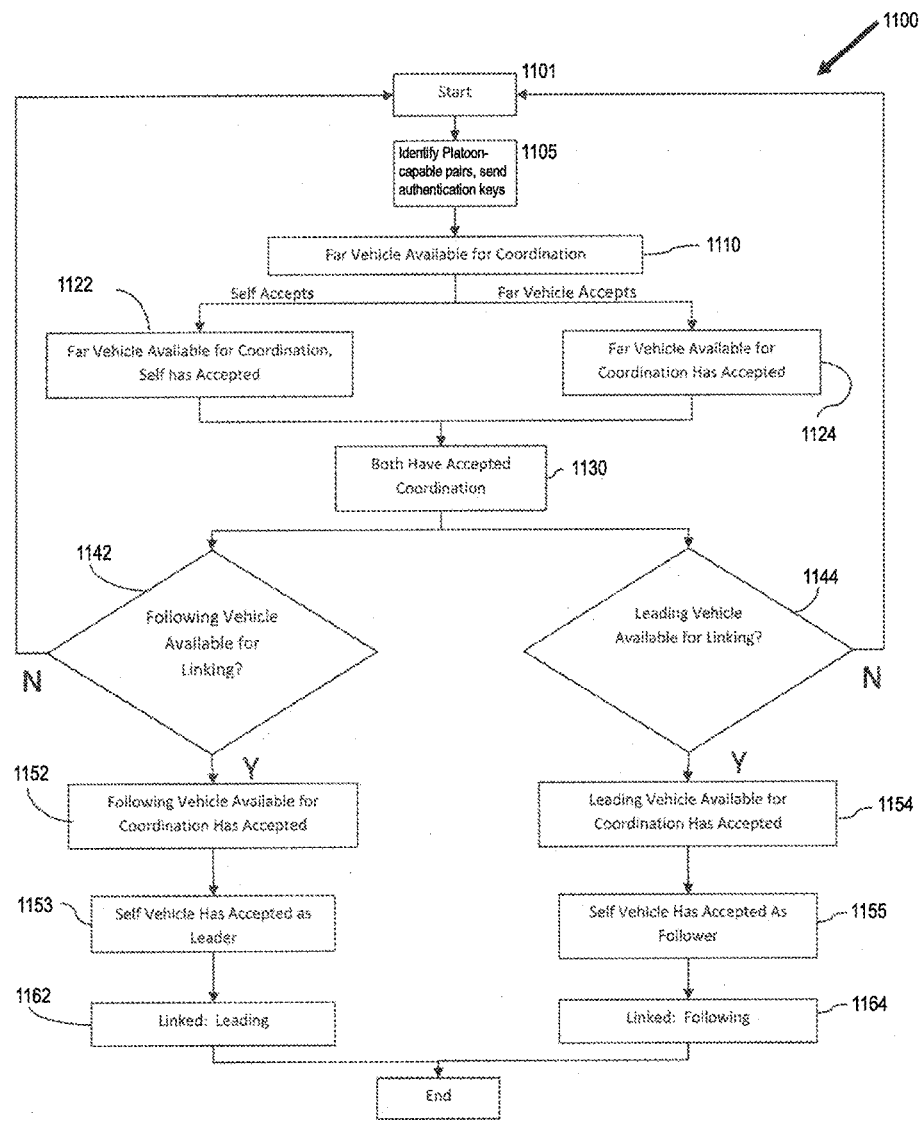
Figure 11A: Coordination and Linking Flowchart

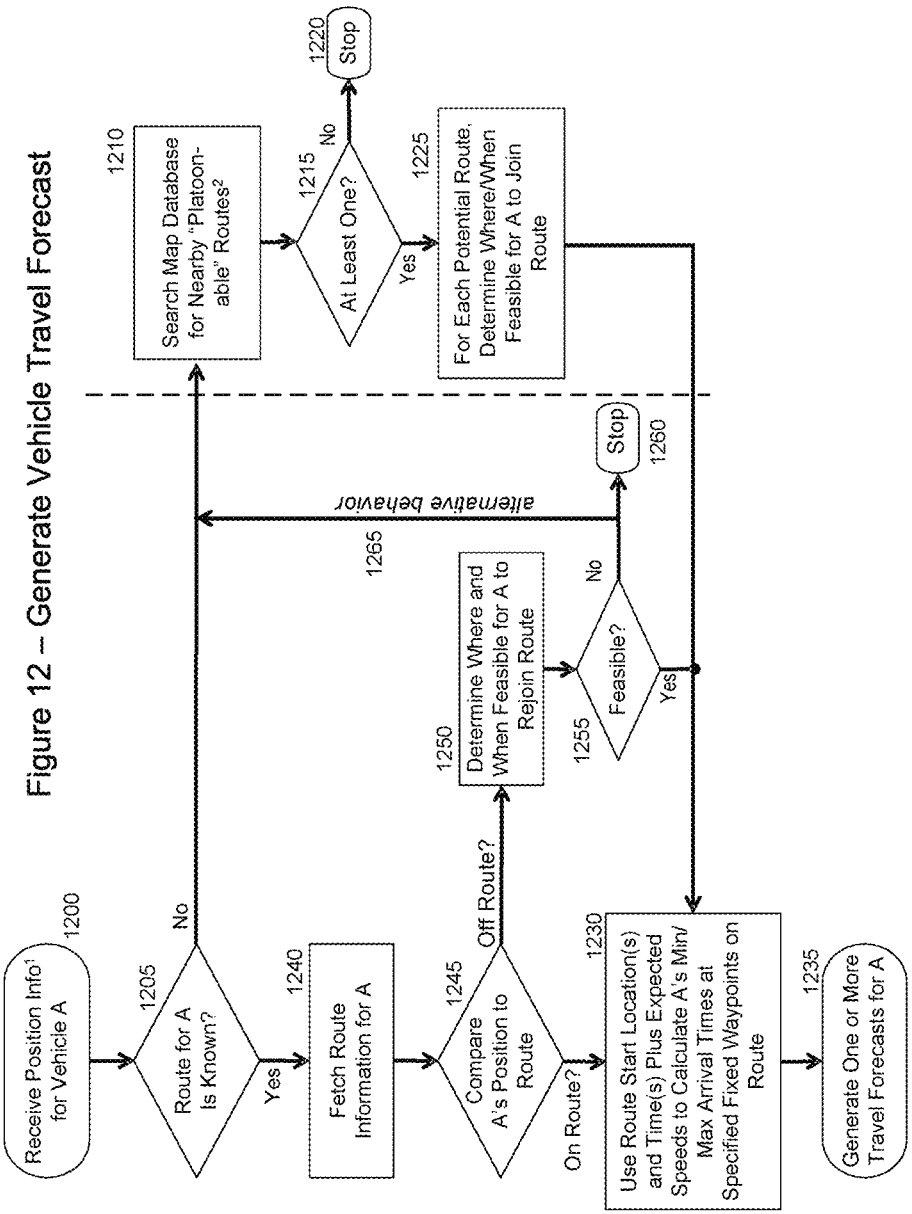
Figure 12 – Generate Vehicle Travel Forecast

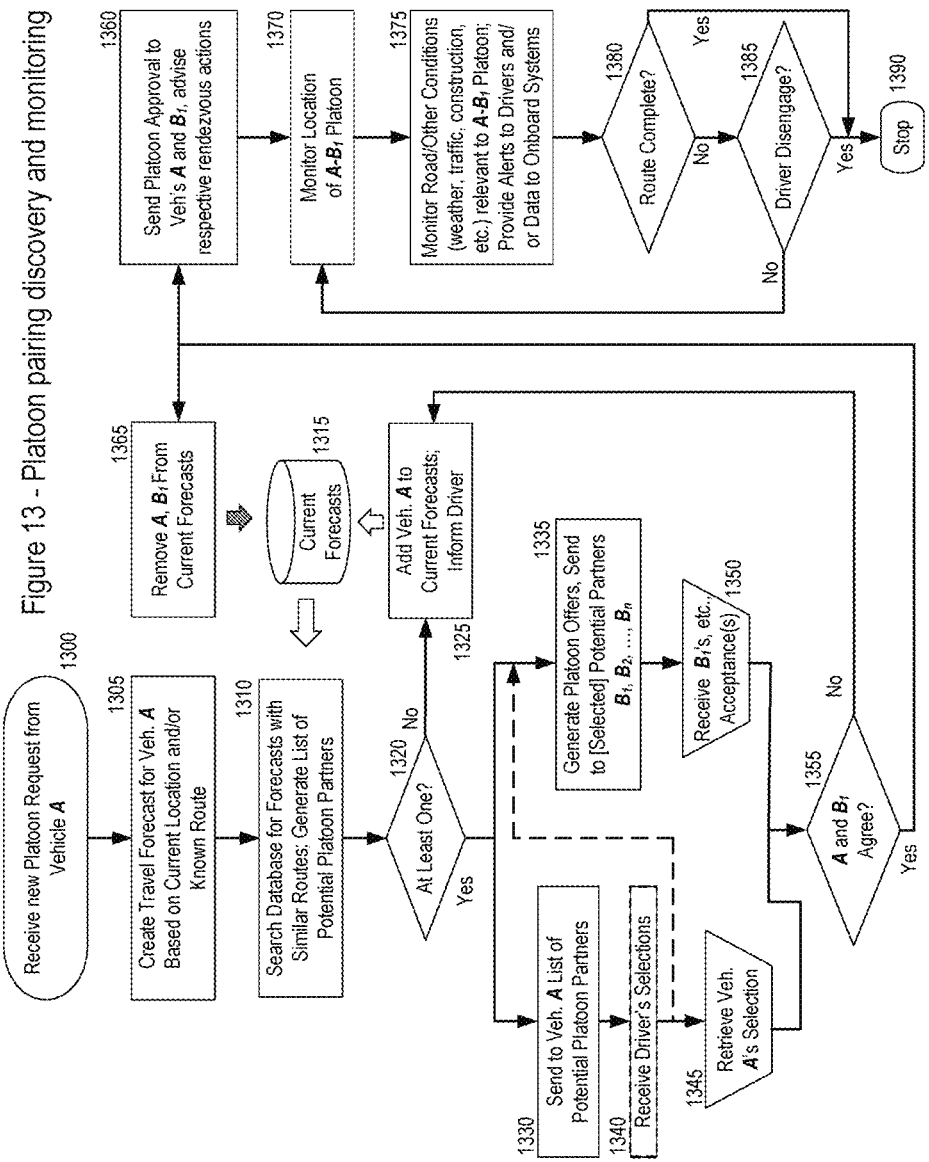

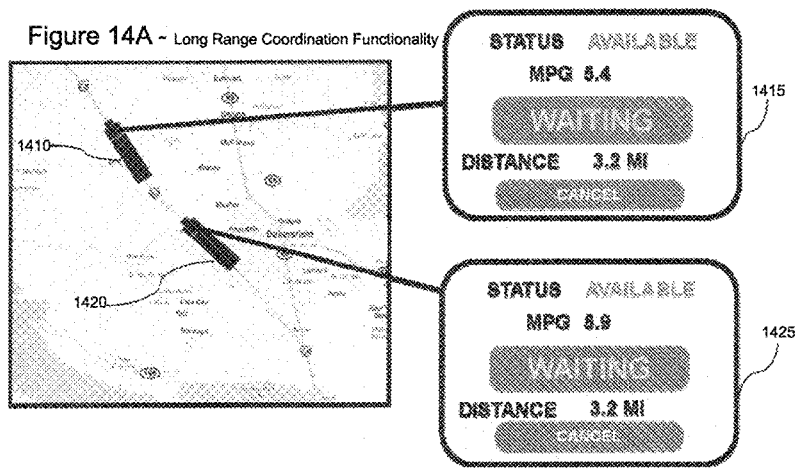
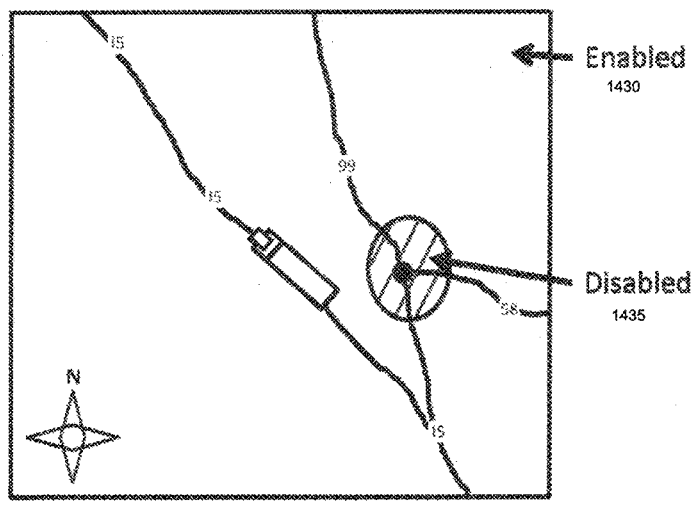

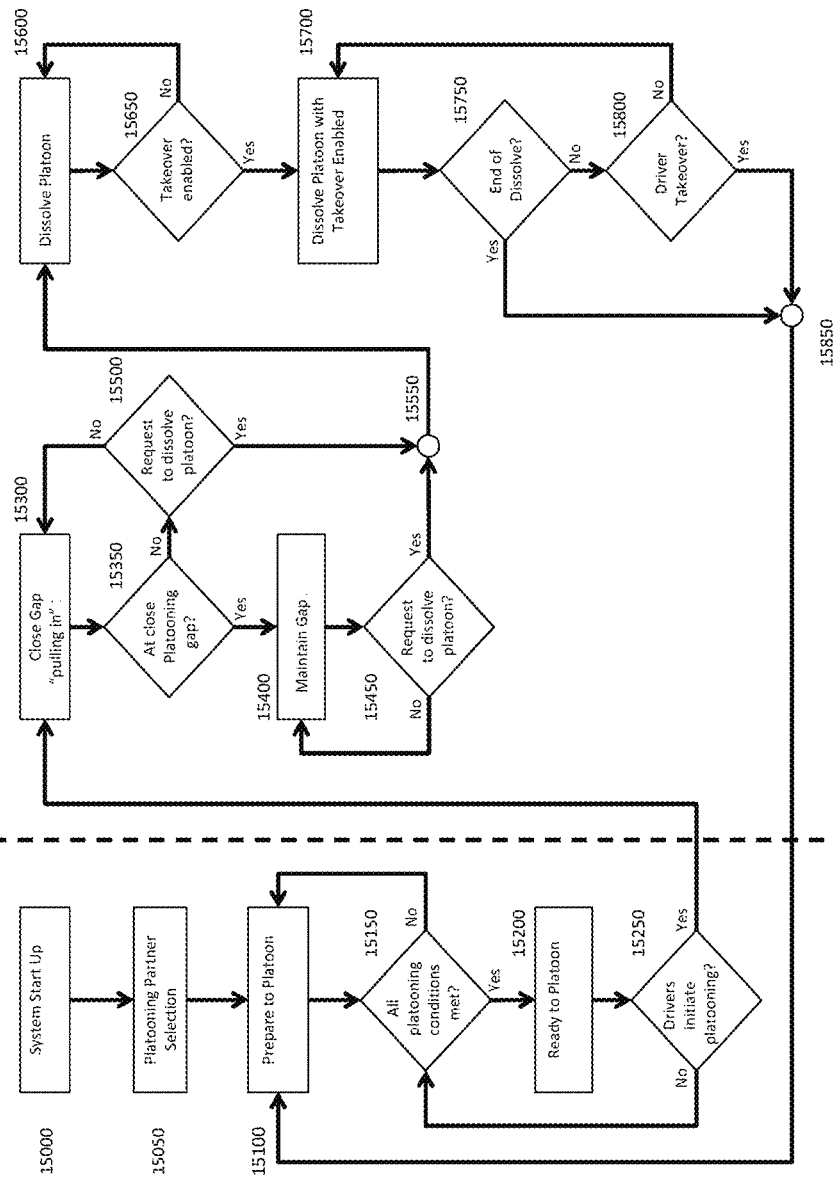
Figure 15A - High-Level Flowchart for Platooning System

Figure 16A – Roadway Segments
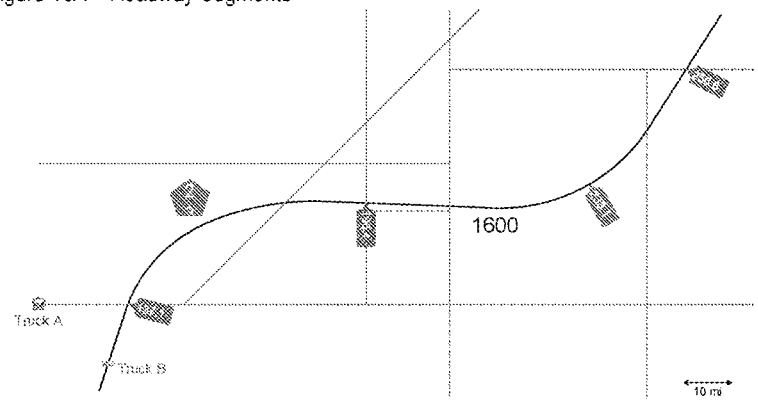
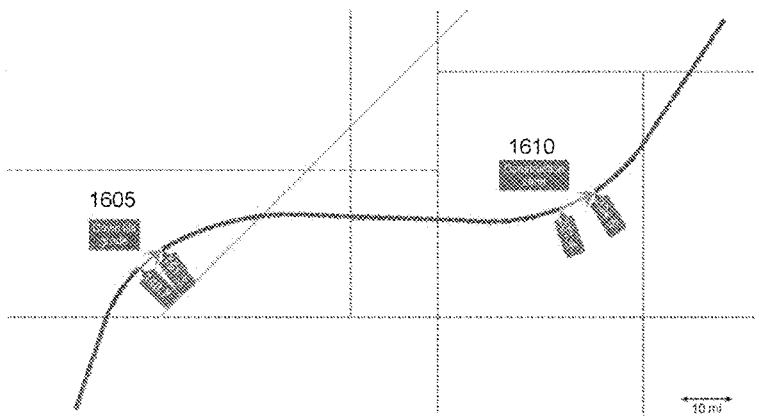
Figure 16B – Identification of Platoonable Segments

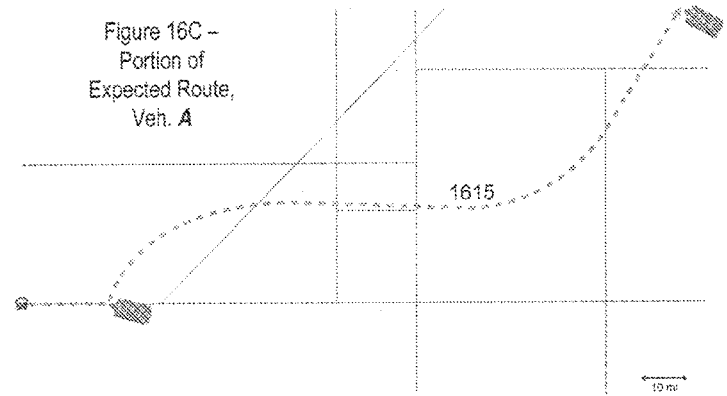
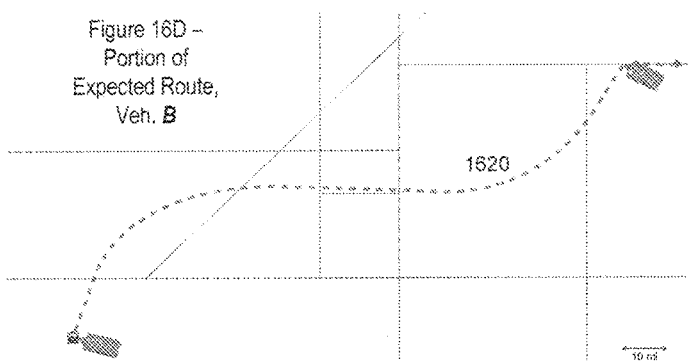
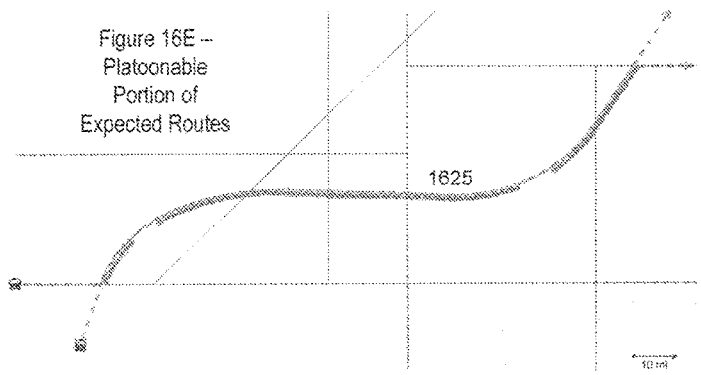

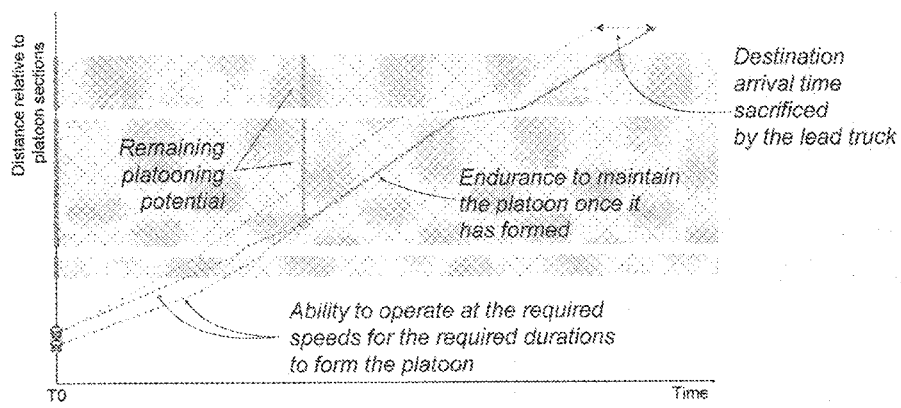
Figure 17A – Platoon Cost-Benefit
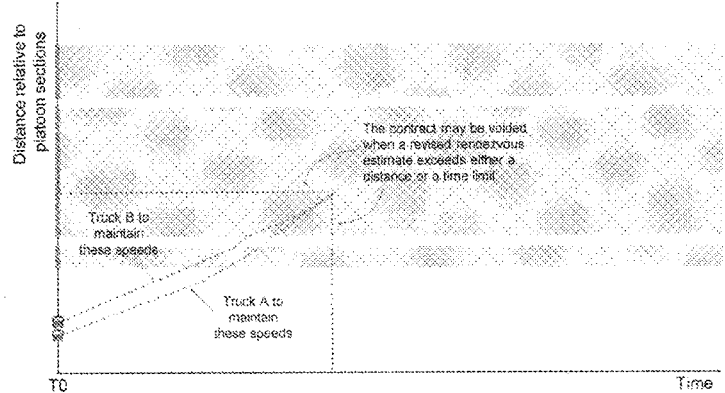
Figure 17B – Rendezvous Guidance

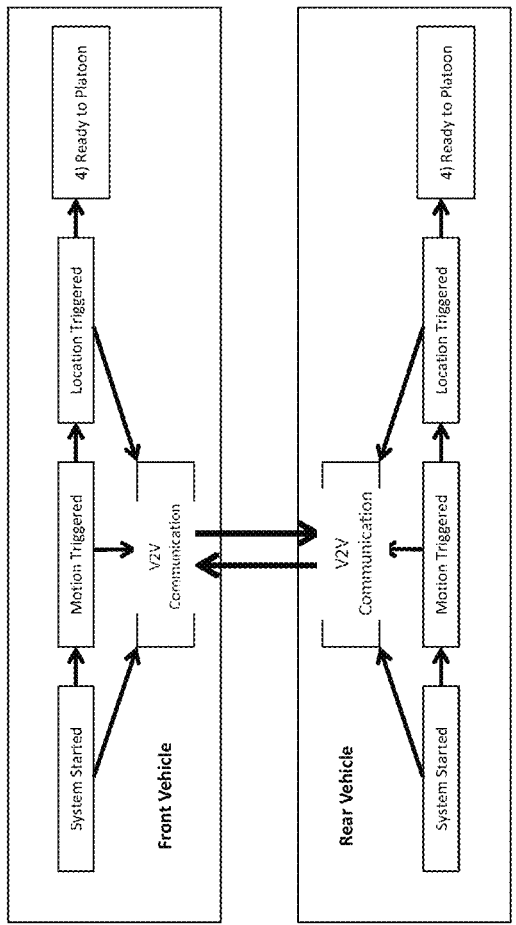

Figure 21 Rendezvous Flow

Platooning Flow

DEVICES, SYSTEMS, AND METHODS FOR REMOTE AUTHORIZATION OF AUTONOMOUS VEHICLE OPERATION

CROSS-REFERENCE TO RELATED APPLICATIONS

This application is a continuation-in-part of PCT Application PCT/US16/49143, filed Aug. 26, 2016, which claims priority from U.S. Patent Application No. 62/210,374, filed Aug. 26, 2015; U.S. Patent Application No. 62/249,898, filed Nov. 2, 2015; U.S. Patent Application No. 62/343,819, filed May 31, 2016; U.S. Patent Application No. 62/363,192, filed Jul. 15, 2016; and U.S. Patent Application No. 62/377,970, filed Aug. 22, 2016. The present application also claims priority from U.S. Patent Application No. 62/531,293, filed Jul. 11, 2017. All of these just-mentioned applications are incorporated by reference herein.

FIELD OF THE DISCLOSURE

This application relates generally to methods, systems and devices that improve safety, diagnostics, analytics and fuel savings for vehicles, including but not limited to enabling at least a second vehicle to follow, safely, a first vehicle at a close distance in an automated or semi-automated manner. More particularly, the present disclosure relates to mesh networks, vehicle monitoring and control systems, and vehicle routing systems which achieve the foregoing objectives.

BACKGROUND

Enabling a vehicle to follow closely behind one vehicle safely through partial or full automation has significant fuel savings and/or safety or labor savings benefits, but is generally unsafe when a driver tries to do this manually. Presently, during normal driving, vehicle motion is controlled either manually, by a driver or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle. In general, these cruise control systems provide minimal added safety, and do not have full control of the vehicle (in terms of being able to fully brake or accelerate).

During rare emergencies, the acceleration and braking of a vehicle may be controlled by active safety systems. Some safety systems try to actively prevent accidents, by braking the vehicle automatically (without driver input), or assisting the driver in braking the vehicle, to avoid a collision. These systems generally add zero convenience, and are only used in emergency situations, but they are able to fully control the vehicle's motion.

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining a constant headway as an automated system is. In fact, a driver trying to maintain a constant headway often causes rapid and large changes in command (accelerator pedal position for example), resulting in a loss of efficiency.

It would be desirable to have reliable and economical semi-automated vehicular convoying or platooning systems which enable vehicles to follow closely together in a safe, efficient, convenient manner.

Careful selection of vehicle routing is important to successful vehicle platooning. While various mapping algorithms exist to describe highways and other roads, these algorithms have not led to routing appropriate for vehicle platooning. As a result, there also has arisen a need to develop methods and systems for identifying appropriate sections of roadway over which platooning of vehicles, including tractor-trailer rigs, can be safely conducted.

Further, in some instances it is desirable, and even necessary, to select correctly one specific vehicle out of a plurality of similar vehicles in appearance to sensors or other system capabilities. Still further, it is sometimes important for a first vehicle to identify characteristics of at least a second vehicle while both (or all) vehicles are proceeding at speed on an open road, for example, the length of all or some portion of the second vehicle.

Once the vehicles are selected, initiation of the platoon, or pull-in, requires careful adjustment by the system of the speed of the two vehicles to increase safety margin to compensate for approach speed. In one aspect, the approach speed of the back vehicle relative to the front vehicle is adjusted as a function of the current gap between the vehicles.

In addition to managing the pull-in process for beginning a platoon, the system identifies conditions suggesting or requiring dissolution of the platoon, as well managing the dissolve process.

SUMMARY

The system and methods comprising various aspects of the disclosure described herein combine attributes of state of the art convenience, safety systems, and manual control to provide a safe, efficient convoying or platooning solution. For example, but without limitation, aspects of the present invention enable a first potential platooning partner to identify a sensed vehicle based on data received from the sensors local to the first vehicle, sometimes in combination with communications received from the sensed vehicle, or from a network operating center (NOC) or other network source, or via satellite link. Aspects of the disclosure achieve this objective by combining elements of active vehicle monitoring and control with communication techniques that permit drivers of both lead and trailing vehicles to have a clear understanding of their motoring environment, including a variety of visual displays, while offering increased convenience to the drivers, together with the features and functionality of a manually controlled vehicle.

To achieve the foregoing, in accordance with aspects of the present disclosure, systems and methods for semi-automated vehicular convoying or platooning provide, among other things: 1) a close following distance to save significant amounts of fuel; 2) safety in the event of emergency maneuvers by the leading vehicle; 3) safety in the event of component failures in the system or either vehicle; 4) an efficient mechanism for identifying partner vehicles with which to convoy or platoon, as well as identifying sections of road suitable for safe convoying or platooning; 5) an intelligent ordering of the vehicles based on several criteria; 6) other fuel economy optimizations made possible by the close following; 7) control algorithms to ensure smooth, comfortable, precise maintenance of the following distance appropriate for the operating environment and the vehicles in the convoy or platoon; 8) robust failsafe mechanical hardware onboard the vehicles; 9) robust electronics and communication; 10) robust, diverse forms of communication among the vehicles in and around the convoy or platoon for the benefit of the driver and for regular, reliable communications with a network operations center such as maintained by a fleet manager; 11) assistance in preventing other types of accidents unrelated to the close following mode; 12) identification of one or more vehicles with which a first vehicle is communicating; 13) use of one or more modalities for determining and/or confirming distance separating vehicles of interest; 14) integrating data received from one or more sensors on a local, or sensing, vehicle, for identifying a second, or sensed, vehicle; 15) developing alternative approaches for determining vehicle location, including relative location among two or more vehicles.

In the following description, terms such as "convoy" and "platoon" are used synonymously. "Close following" applies to both terms, and in appropriate circumstances may be considered to be synonymous with either of those terms as well, though the concepts presented apply to vehicles at various following distances. For example, in a situation in which a convoy or platoon is interrupted on a short-term basis, such as when another vehicle comes between two platooned vehicles in the course of a multiple lane change, the driver of the following vehicle in the platoon may apply the brakes to provide greater distance between the lead vehicle and the following vehicle. That greater distance may be greater than would be the case when the vehicles are platooned, but the two vehicles still may be considered to be close to each other. As another example, two vehicles which are not platooned may either be in the process of forming or re-forming a platoon, or may be sufficiently close together for there to be consideration of platoon formation. In any of these instances, the vehicles may be sufficiently close to each other to allow certain types of short-range intervehicle (vehicle-to-vehicle, or V2V) communications. In that circumstance, the following vehicle may be considered to be closely following the lead vehicle.

Initiation of a platoon, sometimes referred to herein as pull-in, involves management of the relative speeds between the vehicles. The objective of that system management is to ensure that the distance between the two vehicles is increased or decreased to the safety margin.

It will be appreciated by those skilled in the art that the various features of the present disclosure can be practiced alone or in combination. These and other features of the present disclosure will be described in more detail below in the detailed description of the disclosure and in conjunction with the following figures.

BRIEF DESCRIPTION OF THE DRAWINGS

In order to describe the various aspects of the present disclosure, some detailed description now will be provided, by way of illustration, with reference to the accompanying drawings, in which:

FIG. 6 illustrates in simplified form a variety of types of messages sent between the NOC and the vehicles, together with simplified architectures for the onboard system and the NOC;

FIG. 8A illustrates in greater detail the Platooning Supervisor Layer of FIG. 7A;

FIGS. 11A-11B illustrate in flow diagram form aspects of a process for coordination and linking in accordance with aspects of the disclosure, including consideration of factors specific to the vehicles;

FIG. 12 illustrates software architecture suited to perform the travel forecasting function that is one aspect of the present disclosure;

FIG. 13 illustrates in flow chart form aspects of a sequence for platoon pairing discovery and monitoring;

FIGS. 14A-14B illustrate a long range coordination aspect of the present disclosure, including a geofencing capability;

FIG. 15A illustrates in flow chart form aspects of the present disclosure by which vehicles "pull in" to a platooning position, maintain a close platooning gap for a period of time, and then dissolve the platoon as appropriate;

FIGS. 16A-16E illustrate a process for segmenting a roadway for purposes of identifying sections where platooning can be authorized, and the resulting platooning routing for a pair of vehicles, in accordance with one aspect of the present disclosure;

FIG. 17A illustrates analyzing platoon cost-benefit in accordance with one aspect of the present disclosure;

FIG. 17B illustrates rendezvous analysis and guidance based on velocity and heading of a pair of potential platoon partners in accordance with one aspect of the present disclosure;

FIG. 19A illustrates a process for coordination of departing vehicles;

DETAILED DESCRIPTION

Figure 2:
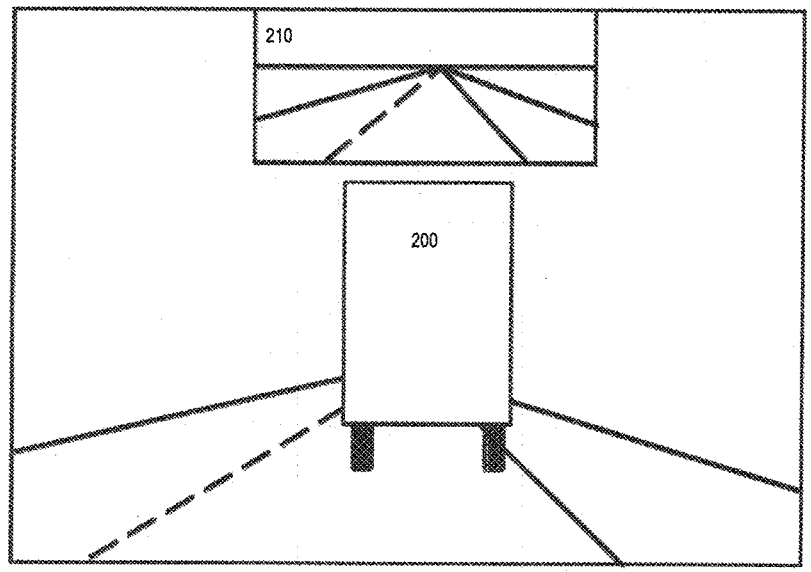
FIG. 2 shows one aspect of the forward-looking view seen by the trailing vehicle.

In accordance with aspects of the present disclosure, there are devices, systems (including a processor and non-volatile memory), and methods of remotely authorizing vehicle automation for one or more vehicles out of a plurality of vehicles, the vehicle automation including autonomous operation of the one or more vehicles, including: analyzing, at a network operations center (NOC), external conditions in a vicinity of one or more of the plurality of vehicles, the external conditions being selected from the group consisting of location, time of day, road conditions, weather, and traffic; analyzing, at the NOC, internal conditions relating to the one or more of the plurality of vehicles, the internal conditions being selected from the group consisting of vehicle characteristics, vehicle position, vehicle route, vehicle destination, heading, and platooning availability; and responsive to the analyzing of the external and internal conditions, authorizing, at the NOC, the autonomous operation of at least one of the plurality of vehicles; the authorizing enabling the at least one vehicle to engage in autonomous operation.

In some aspects, the authorizing comprises specifying which of the plurality of vehicles are authorized to engage in autonomous operation, and further comprising transmitting one or more data packets containing information to: specify a first location at which the autonomous operation may begin; and specify a second location, beyond the first location, and beyond which the autonomous operation is not authorized.

In some aspects, the authorizing comprises specifying which of the plurality of vehicles are authorized to engage in autonomous operation, and further comprising transmitting one or more data packets containing information to: specify which of the plurality of vehicles are authorized to engage in autonomous operation; specify a time when the autonomous operation may begin; and specify a duration of the autonomous operation.

In accordance with aspects of the present disclosure, there are devices, systems (including a processor and non-volatile memory), and methods of forming a platoon between at least first and second vehicles out of a plurality of vehicles, wherein one of the vehicles will be a lead vehicle in the platoon and one of the vehicles will be a following vehicle in the platoon, including: analyzing, at a network operations center (NOC), external conditions in a vicinity of two or more of the plurality of vehicles, the external conditions being selected from the group consisting of location, time of day, road conditions, weather, and traffic; analyzing, at the NOC, internal conditions relating to two or more of the plurality of vehicles, the internal conditions being selected from the group consisting of vehicle characteristics, vehicle position, vehicle route, vehicle destination, heading, and platooning availability; responsive to the analyzing of the external and internal conditions, authorizing, at the NOC, formation of the platoon, wherein authorizing formation of the platoon includes: specifying a first location at which the platoon may begin; and specifying a second location, beyond the first location, and beyond which platooning is not authorized; the authorizing enabling the lead and following vehicles to form the platoon.

In some aspects, the authorizing further comprises: specifying which two of the plurality of vehicles are authorized to form the platoon; and specifying which of those two vehicles will be the lead vehicle and which will be the following vehicle.

In accordance with aspects of the present disclosure, there are devices, systems (including a processor and non-volatile memory), and methods of forming a platoon between at least first and second vehicles out of a plurality of vehicles, wherein one of the vehicles will be a lead vehicle in the platoon and one of the vehicles will be a following vehicle in the platoon, including: analyzing, at one of the vehicles in the platoon, external conditions in a vicinity of two or more of the plurality of vehicles, the external conditions being selected from the group consisting of location, time of day, road conditions, weather, and traffic; analyzing, at one of the vehicles in the platoon, internal conditions relating to two or more of the plurality of vehicles, the internal conditions being selected from the group consisting of vehicle characteristics, vehicle position, vehicle route, vehicle destination, heading, and platooning availability; responsive to the analyzing of the external and internal conditions, authorizing, at one of the vehicles in the platoon, formation of the platoon, wherein authorizing formation of the platoon includes: specifying a first location at which the platoon may begin; and specifying a second location, beyond the first location, and beyond which platooning is not authorized; the authorizing enabling the lead and following vehicles to form the platoon.

In accordance with aspects of the present disclosure, there are devices, systems (including a processor and non-volatile memory), and methods of generating a travel forecast for pairing of vehicles from a plurality of vehicles to form a platoon, including: receiving, in a processor, position information for a first vehicle from the plurality of vehicles; retrieving routing information for the first vehicle by either accessing the routing information stored in memory associated with the processor or determining, in the processor, the routing information based on a set of known acceptable routes stored in the memory; comparing, in a processor, the position information of the first vehicle to the routing information; determining maximum and minimum times for the first vehicle to reach an area on a route based at least in part on the position information and the routing information together with expected respective speeds of the plurality of vehicles; and generating the travel forecast for the first vehicle.

In some aspects, generating the travel forecast further includes communicating the travel forecast for the first vehicle to a remote processor for identification, within the plurality of vehicles, of other vehicles suitable for pairing with the first vehicle to form the platoon.

In accordance with aspects of the present disclosure, there are devices, systems (including a processor and non-volatile memory), and methods of identifying potential platoon partners, including: retrieving from memory associated with a processor a first travel forecast for a first vehicle; retrieving from memory associated with a processor a second travel forecast for a second vehicle; comparing the respective first and second travel forecasts to identify physical road segments common to the first and second travel forecasts; and in a processor, determining from the first and second travel forecasts whether the first and second vehicles will arrive in respective locations sufficiently close to at least one of the physical road segments, at times sufficiently close to permit the first and second vehicles to form a platoon.

In some aspects, the first and second vehicles are two of a plurality of vehicles which are potential platoon partners, and an ability of the second vehicle to arrive at a location sufficiently close to at least one of the physical road segments is not as great as that of one or more other vehicles in the plurality of vehicles.

In accordance with aspects of the present disclosure, there are devices, systems (including a processor and non-volatile memory), and methods of identifying potential platoon partners, including: retrieving from memory associated with a processor a first travel forecast for a first vehicle from among the plurality of vehicles; retrieving from memory associated with a processor a plurality of other travel forecasts for other vehicles in the plurality of vehicles, wherein each of the other travel forecasts is for a respective vehicle distinct from the first vehicle; comparing the respective first travel forecast to each of the other travel forecasts to identify a set of physical road segments, each physical road segment of the set being common to the first travel forecast and one of the plurality of other travel forecasts; in a processor, determining from the first travel forecast and each of the other travel forecasts whether the first and each of the respective vehicles will arrive in respective locations sufficiently close to at least one of the physical road segments from the set of road segments, at times sufficiently close to permit the first and each of the respective vehicles to form a platoon; and responsive to determining which of the vehicles will arrive at times sufficiently close to permit forming a platoon, selecting a platoon partner for the first vehicle.

In some aspects, an ability of the selected platoon partner to arrive at a location sufficiently close to at least one of the physical road segments is not as great as that of one or more other vehicles in the plurality of vehicles.

Aspects of the present disclosure now will be described in detail with reference to the accompanying drawings. In the following description, numerous specific details are set forth in order to provide a thorough, including, in some cases, one or more alternatives. It will be apparent to those skilled in the art that the methods and systems in the present disclosure can be practiced without implementing all of the features disclosed herein.

The present disclosure relates to systems and methods for automated and semi-automated vehicular convoying. Such systems enable vehicles to follow closely behind each other, in a convenient, safe manner. For convenience of illustration, the exemplary vehicles referred to in the following description will, in general, be large trucks, including but not limited to tractor-trailers, but those skilled in the art will appreciate that many, if not all, of the features described herein also apply to many other types of vehicles. Accordingly, this disclosure, and at least some of the aspects disclosed herein, need not be limited to vehicles of any particular type.

Figure 1A:
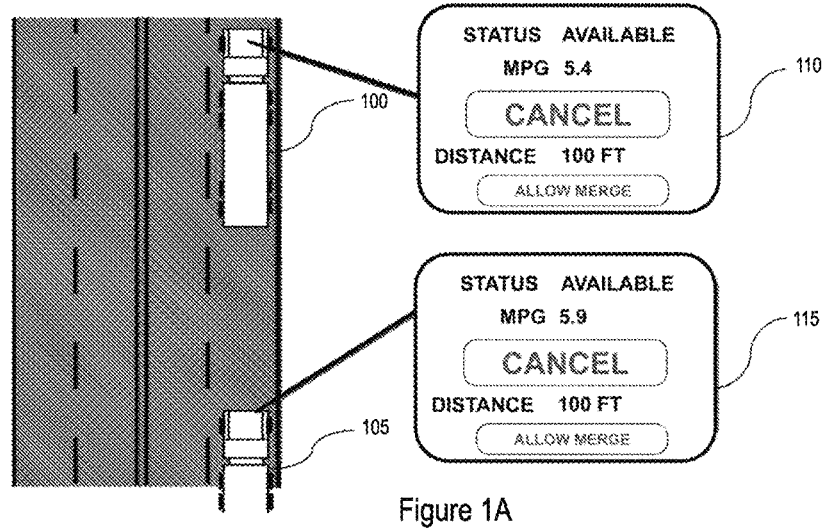
FIGS. 1A-1C show a lead vehicle and a following or trailing vehicle at different stages of platooning in accordance with aspects of the present disclosure.
Figure 1B:
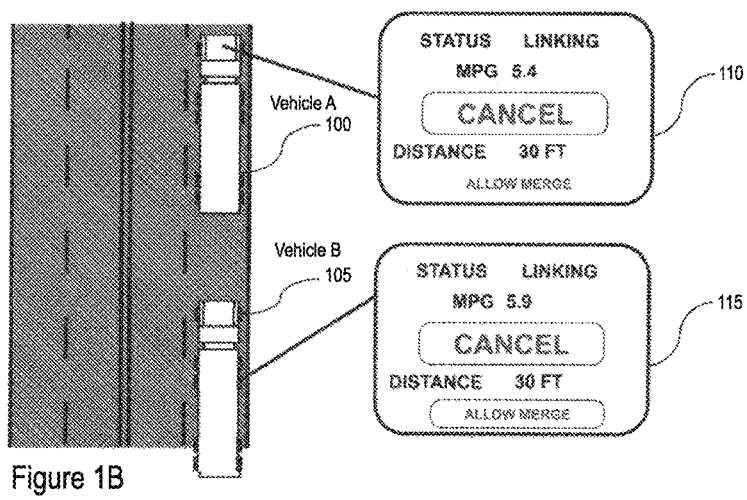
Figure 1C:
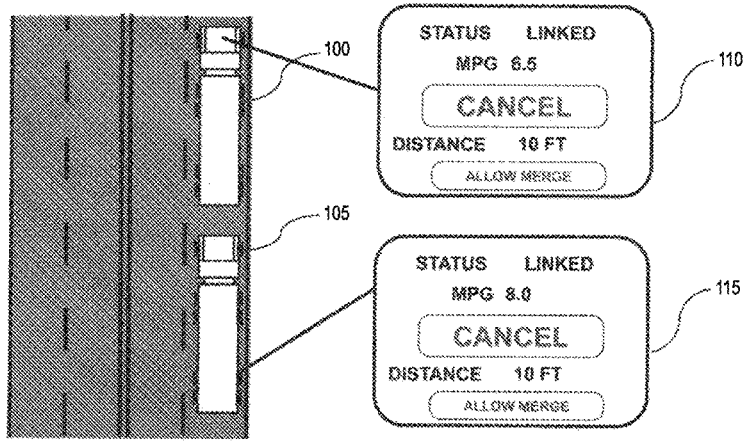

FIGS. 1A-1C illustrate three stages of a platoon. In FIG. 1A, vehicle A, indicated at 100, and vehicle B, indicated at 105, are operating independently of one another, but each is available for linking. In some aspects, the displays shown at 110 and 115, for vehicles A and B, respectively, illustrate status, distance from a candidate partner vehicle, and fuel consumption, in some instances, although other data also can be displayed, as will be better appreciated from the description herein. In FIG. 1A, vehicles A and B are shown as being 100 feet apart, and available for linking (platooning). In FIG. 1B, the vehicles have moved sufficiently close to each other (here, 30 feet) that linking, or merging into a platoon, is allowed. The displays are updated to show the separation, and the changed status from "available" to "linking".

As explained in greater detail herein, in one aspect, candidates for linking typically are selected at a network operations center (NOC), such as, for example, a fleet management center, if the vehicles are large trucks. In one aspect, the NOC sends each vehicle a message identifying suitable candidates for linking, together with information to enable both drivers to reach a target rendezvous point at the same time so that they can form a platoon.

Referring again to FIG. 1B, under guidance from the NOC in one aspect, vehicles A and B have been guided to a rendezvous point on a section of roadway suitable for platooning. As discussed in U.S. Pat. No. 8,744,666, incorporated herein by reference, aspects of which are discussed in greater detail herein, when the two vehicles are sufficiently close to each other, a communications link is established between them, and a processing system in the front, or lead, vehicle, begins communicating with a similar processing system in the back, or following, vehicle. In one aspect, the lead vehicle then issues commands to the processing system of the following vehicle to control, for example, the acceleration and braking of the following vehicle and bring it into position at a close following distance behind the lead vehicle. In one aspect, the processor in the lead vehicle also controls the acceleration and braking of the lead vehicle to ensure that the following vehicle can be guided safely into position behind the lead vehicle but at a specified following distance, for example in the range of 10 feet to 60 feet.

Once the following vehicle has been guided into platooning position, the lead vehicle maintains control of at least the acceleration and braking of the following vehicle. At this point, the vehicles are linked, as shown in FIG. 1C. The displays show vehicle separation as 10 feet, and vehicle status as "linked". In at least some aspects, while the lead vehicle may control acceleration and braking of the following vehicle, the driver of the rear vehicle can remain in control of steering, such that the rear vehicle is operated only in a semi-automated manner. In other aspects, fully automated operation of the rear vehicle, including steering, is implemented. It will be appreciated by those skilled in the art that semi-automated and automated are sometimes referred to as semi-autonomous and autonomous. In this disclosure, "semi-automated" and "semi-autonomous" are used interchangeably, and "automated" and "autonomous" are used interchangeably.

FIG. 2 shows the view from the front of the rear vehicle when the vehicles are linked. The Figure shows the lead vehicle as a truck as an example for purposes of illustration only. The lead vehicle 200, which is immediately in front of the following vehicle, has a display 210 which shows the view from a forward-facing camera mounted on the lead vehicle. In some aspects, haptic or audio devices can be provided to ensure that the driver of the following vehicle stays substantially directly behind the lead vehicle while platooning. For example, should the driver of the following vehicle veer out of the lane to the left, an audio signal on the left side can be activated to assist the driver in returning the vehicle to the proper alignment with respect to the lead vehicle. Similarly, should the driver of the following vehicle veer out of the lane to the right, an audio signal on the right side can be activated. In some aspects, the audio signal to be activated can be reversed; that is, a veer to the left can activate the right audio signal, and vice versa. Moreover, the audio signal may not be directional in nature, but more generally may indicate a drift or other movement requiring compensation. Should a haptic stimulus be preferred, a pair [right and left] of vibration sources can be implemented either in the steering wheel, or the driver's seat, or both. Alternatively, a single vibration source can be used in some aspects.

When the vehicles are in platoon formation, a short range communications link such as dedicated short range communications (DSRC) is adequate for communicating messages between the processors of each vehicle, although other forms of wireless communication can be used, for example, cellular. However, even while in platoon formation, it is useful for the vehicles to maintain regular communication with the NOC. As will be discussed in greater detail herein, a variety of data is sent from each vehicle to the NOC, including vehicle condition and performance, route changes, local weather, and other data. This data transmission permits the fleet operator to be proactive in managing vehicle maintenance and repair, adjusting routing for weather problems or road construction, identifying vehicle location in the event of an emergency, and managing a variety of other analytics.

Figure 3:
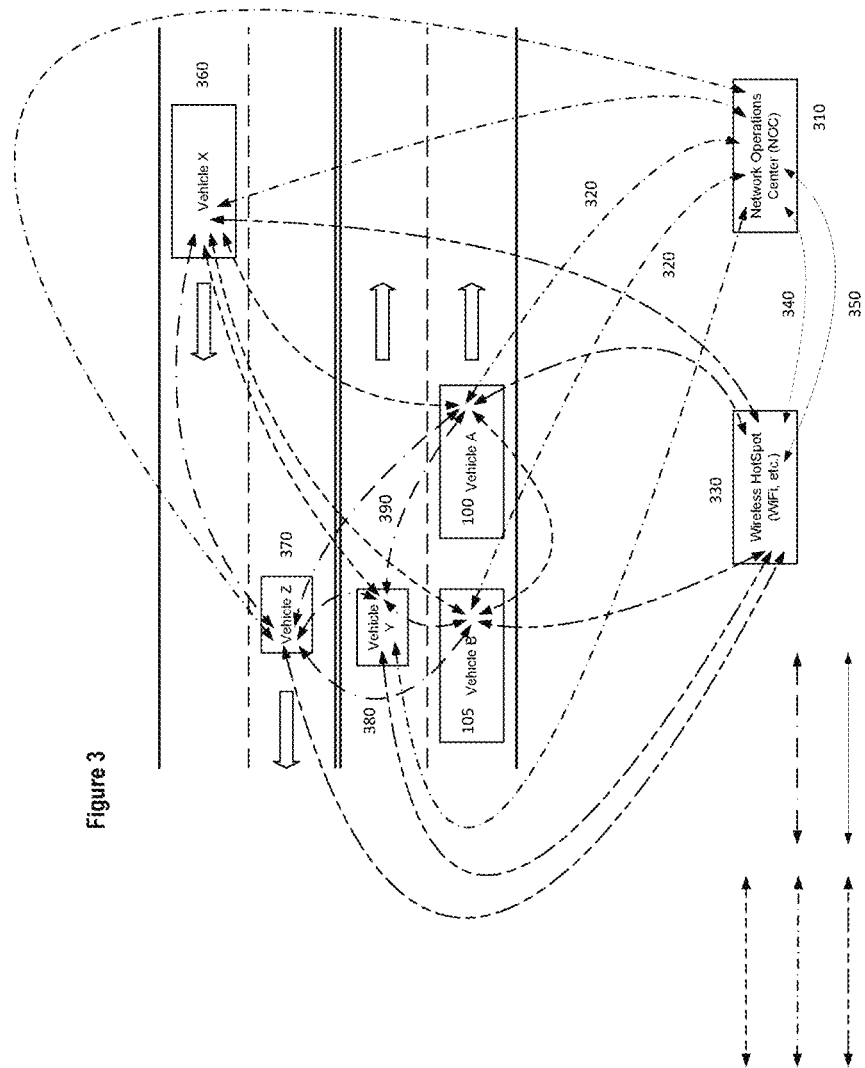
FIG. 3 shows a variety of communications links between platooning vehicles, ancillary vehicles, wireless transceivers, and a network operations center.

FIG. 3 illustrates one aspect of communications links for managing messaging in a system according to the disclosure, using a variety of communications protocols for managing messaging among potential or actual platoon partners, one or more associated NOCs, and a wireless access point which provides remote access to the NOCs.

Further, in instances where communication with the NOC is unavailable for a period of time, FIG. 3 illustrates one aspect of a mesh network by which messages can be communicated between the NOC and a vehicle through intermediary vehicles. More particularly, vehicle 100 is in communication with platoon partner vehicle 105 via DSRC or other suitable wired or wireless technologies. In addition, for most of vehicle 100's route, it is also in communication with NOC 310 via a cellular link 320. Similarly, vehicle 105 communicates with NOC 310 via a cellular link 320, absent a break in the wireless link.

However, cellular communication is not always possible, especially in vehicles driving long distances through varied terrain. Further, cellular communication is relatively slow for transferring large amounts of data, such as may be stored on the vehicle if video recording or other high bandwidth functions are involved. Thus, in some aspects vehicles 100 and 105 are also equipped to access WiFi hotspots 330, which in turn communicate with the NOC through either a wireless link illustrated at 340, or wired channel illustrated at 350. Fixed WiFi hotspots are increasingly present along the roadway, as well as at fleet operations centers. In addition, vehicle WiFi hotspots based on 4G LTE or similar services are available. Microcell and similar technologies also can provide a communications link in some instances.

In some aspects a relay technique based on an ad hoc mesh network can be used. For example, vehicle 100 may be traveling east, and may have just passed through an area of good cellular connectivity to the NOC 310, but now is passing through a zone that has no wireless connectivity. In addition, vehicle X, shown at 360 as traveling west, may have been out of contact with the NOC for some period of time, but will regain wireless connectivity sooner than vehicle 100. In at least some aspects, the NOC 310 knows with reasonable precision the location of each of the vehicles that it monitors based on travel forecasts, discussed in greater detail herein, even when cellular or similar links are unavailable. Consequently, if NOC 310 needs to send information to vehicle X, the NOC sends to vehicle 100 the message for vehicle X while vehicle 100 still has connectivity to the NOC. Then, when vehicle 100 and vehicle X are proximate, vehicle 100 can relay the NOC's message to vehicle X. Similarly, if vehicle 100 needs to get data to the NOC, but is presently out of touch with the NOC, it can relay its data to vehicle X, and vehicle X can retransmit the data to the NOC when vehicle X regains connectivity to the NOC.

It will be appreciated by those skilled in the art that, in some aspects although possibly not in others, such wireless messaging will be encrypted for security purposes. With appropriate safeguards, vehicles not within the management of a particular fleet operation can also be used to relay messages. For example, vehicles Y and Z, shown at 370 and 380, can receive messages from Vehicles A and B via various links 390 and then relay those messages to NOC 310 if vehicles Y and Z are properly equipped for communication with the NOC. Such communication can use one or more standard protocols.

In an environment having a sufficient quantity of vehicles equipped for wireless connectivity, a mesh network can be created by which messages can be passed from vehicle to vehicle and thence to the NOC. Such a mesh network also permits the passing of status messages from vehicle to vehicle, so that, for example, a platoon of vehicles 100 and 105 can be aware of the status of surrounding vehicles. For example, the platooned vehicles may be informed when and at what point a vehicle on the left (here, vehicle Y) needs to exit the roadway. Having that information can permit the platooned vehicles to avoid having that vehicle cut in between vehicles 100 and 105 or otherwise behave in an unexpected manner. Likewise, emergency conditions can be communicated to the platoon, comprised of Vehicles A and B, well in advance, permitting increased operational safety.

The preceding discussion has included references to vehicles in the same fleet, or possibly in different fleets. In appropriate circumstances, platooning of vehicles in different fleets (so-called interfleet platooning) may or may not be possible. Irrespective of whether such interfleet, as compared with intrafleet platooning, can occur, various vehicles in communications range of one another can cooperate to pass messages to each other or to the NOC 310.

Referring again to FIG. 3, two exemplary scenarios may facilitate understanding of the foregoing description. In a first scenario, vehicle 360 is approaching its depot. Vehicles 100 and/or 105 may be hours away from their depot. One or both of them may have lost their cell connections with the NOC, and may have messages or data to communicate to the NOC. Vehicle 360, which is in range of vehicles 100 and/or 105, may communicate or broadcast its time to destination, for example, over a DSRC or other short-range communication connection. One or both of vehicles 100, 105, receiving this information, may transmit messages and/or data, perhaps in encrypted fashion, to vehicle 360 over that connection. Vehicle 360 can store that information and, upon arriving at the depot, can move that information to the NOC. Vehicle 360 can communicate to the appropriate vehicle 100 and/or 105 that the information has gone to the NOC. The vehicle that communicated the information to vehicle 360 now no longer has a need for that information, and can discard it.

It should be noted that, in this scenario, vehicle 360 has to be able to communicate with the same NOC as vehicles 100, 105. If all of the vehicles are part of the same fleet, this may be a straightforward intrafleet communication. If the vehicles are in different fleets, alternative arrangements may be necessary, in an interfleet context. In one aspect, vehicle 360 still may be able to communicate with the same NOC as vehicles 100, 105. In another aspect, vehicle 360 may be able to communicate directly only with its own NOC, and not with the NOC for vehicles 100, 105. However, the two NOCs may have an arrangement to communicate with each other, in which case vehicle 360 transmits the data to its NOC, which relays the data to the other NOC. Whatever the path, appropriate security for the message and/or data must be preserved, and the NOCs must be able to communicate with each other at that level of security, or else the message and/or data has to be encrypted in such a way as to be understood only by the NOC for vehicles 100 and 105.

Again referring to FIG. 3, in another scenario, not only vehicles 100 and 105, but also vehicle 360 may be hours away from their respective depots and out of communication with their respective NOCs, but vehicle 370 is still in communication with its NOC, and may broadcast its time to destination while it is in range of vehicles 100, 105, and 360. One of the three out-of-communication vehicles may have messages and/or data to send to its NOC. In this scenario, vehicle 370 acts as the bridge, similarly to the way that vehicle 360 did in the first scenario, and communicates with the appropriate NOC in the same way, also informing the sending vehicle that it has done so. The sending vehicle then can discard the messages it otherwise would have held pending arrival at the depot.

Figure 4:
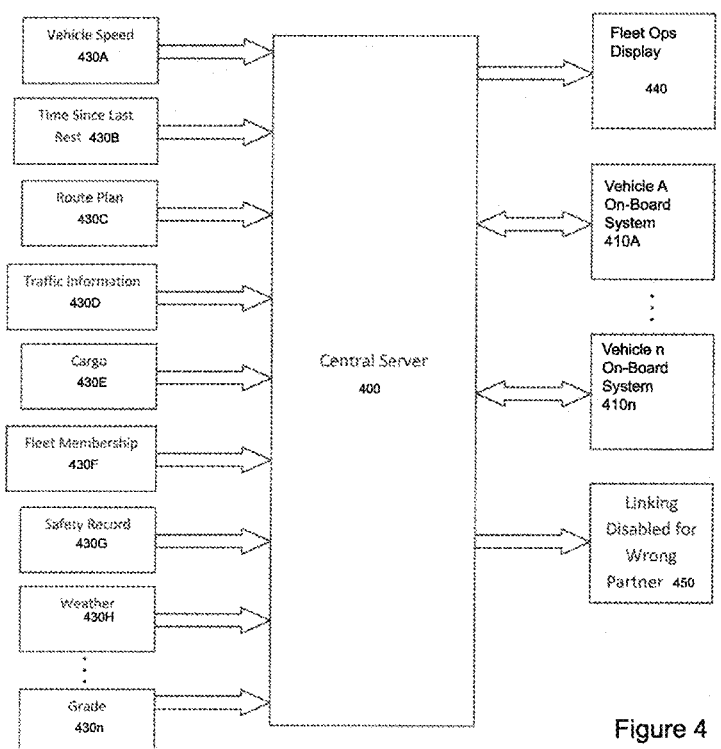
FIG. 4 illustrates a variety of factors that a central server, such as maintained at a NOC, might consider in determining candidates for linking.

With the foregoing understanding of platooning and communications across the network and from vehicle to vehicle, the operation of the central server that, in at least some aspects, directs and monitors the vehicles 100, 105, etc., can be better appreciated. FIG. 4 shows a central server 400 and some of its inputs in simplified block diagram form. The central server 400, either alone or in combination with the system onboard each vehicle 410A, 410B, . . . , 410*n*, makes decisions and suggestions either for platooning or simply for improved operation, based on knowledge of various parameters. Blocks 430A-n show inputs of information including vehicle speed, time since a driver's last rest period, route plan, traffic information, cargo or load (which could include type and/or weight), membership in a fleet, a driver's safety record, weather conditions, and road conditions, including vehicle traffic. Other inputs, including one or more of vehicle location, destination, vehicle type, trailer type, recent linking history, fuel price, driver history, and other factors, also may be employed. The central server 400 and the onboard systems 410A, . . . , 410*n* can communicate with each driver through a driver display attached to each onboard system. Communications can include linking suggestions, road conditions, updated routing information, potential vehicle maintenance issues, and a host of other data, including the ones mentioned immediately above.

In some instances, a linking opportunity may present itself independently of communication from the central server 400. In such an instance, once the potential pairing is identified, that potential pairing is communicated to at least the onboard system and, in most instances although not necessarily all, also is communicated to the central server 400. It is possible that either the central server or the on-board systems will conclude that the pair is not suitable for linking. In that circumstance, linking is disabled, as shown at 450.

As discussed in U.S. Pat. No. 9,645,579, incorporated by reference herein, linking opportunities can be determined while the vehicles are moving, but can also be determined while one or more of the vehicles is stationary, such as at a truck stop, rest stop, weigh station, warehouse, depot, etc. They can also be calculated ahead of time by the fleet manager or other associated personnel. They may be scheduled at time of departure, or hours or days ahead of time, or may be found ad-hoc while on the road, with or without the assistance of the coordination functionality of the system.

Figure 5A:
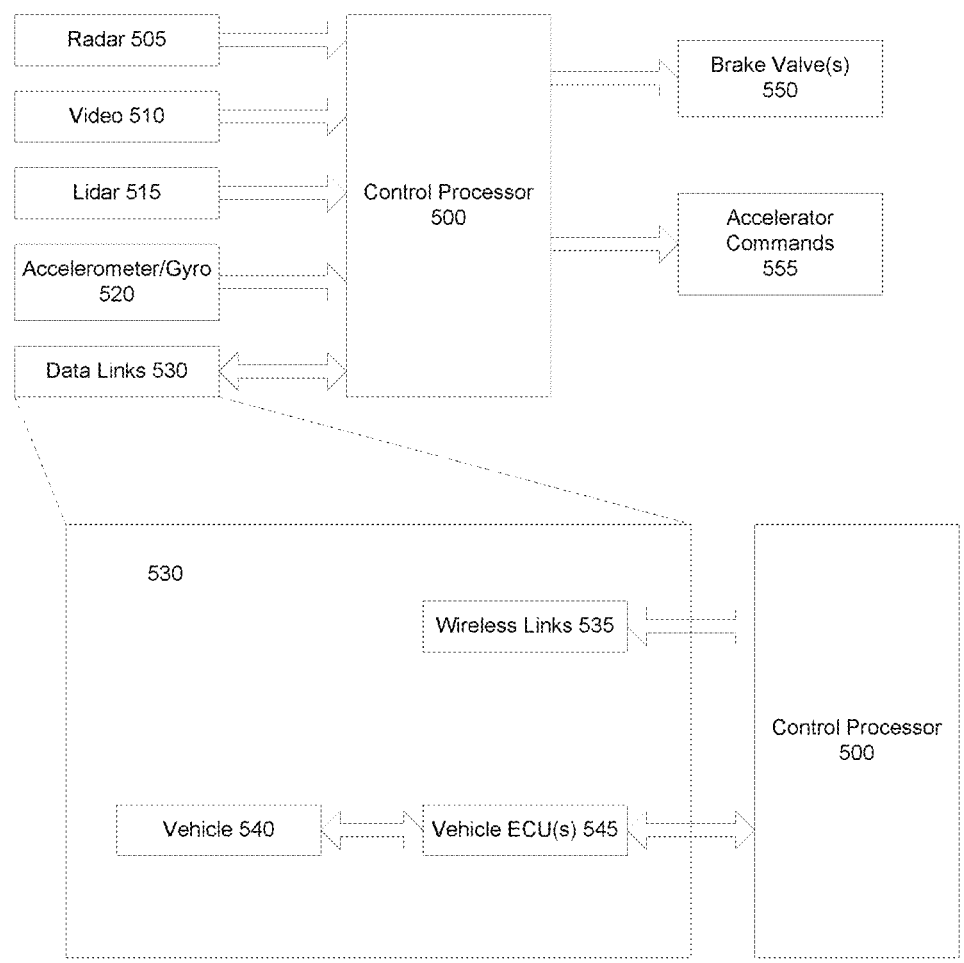
FIG. 5A illustrates in simplified form an onboard vehicle control system for managing communications as well as monitoring and controlling various vehicle functions, in accordance with one aspect.

As noted above, much of the intelligence of the overall system can reside in either the central server, or in the system onboard each vehicle. The onboard system also includes specific functions for controlling the operation of the vehicle. For example, for large trucks as ell as for most vehicles, the onboard system receives a variety of inputs reflecting immediate operating conditions and, based on those plus relevant information received from the central server, controls the vehicle in terms of at least acceleration/velocity, and braking. Thus, as shown in FIG. 5A, one aspect of an onboard system comprises a control processor 500 that receives inputs from, for example, an onboard radar unit 505, a video camera 510, and a lidar unit 515 via a connection which typically (but not necessarily) will be a controller area network (CAN) interface. The control processor 500 can configure each of these units and can receive data from them.

Inertial measurement sensors or gyroscopes (gyros) 520, which can be connected in either wired or wireless fashion to control processor 500, gives the control processor acceleration information in one, two, or three axes, as well as rotation rate information about one, two, or three axes. In some aspects, accelerometers can be substituted for gyros, although gyros are generally used for, for example, rotation rate. A plurality of data links 530, expanded in the lower portion of FIG. 5A to show detail, provide information about relevant characteristics of the leading vehicle 100 and/or the following vehicle 105, including acceleration. Brake valve and sensor 550 provides data on brake pressure, and is used to apply pressure via a command from the control processor 500. Accelerator commands 555 are sent in either analog form, as a voltage, or as a communications signal (CAN or otherwise).

The control processor 500 performs calculations to process the sensor information, information from a graphic user interface (GUI), and information from any other data sources, and determine the correct set of actuator commands to attain the current goal (for example: maintaining a constant following distance with the preceding or trailing vehicle). As shown, the data links include one or more wireless links 535 such as cellular, DSRC, etc. The data links 530 also comprise inputs from the vehicle, shown at 540, which are typically transmitted via the vehicle's engine control unit (ECU) 545 and are typically provided by the vehicle manufacturer. Depending upon the aspect, the control processor 500 communicates bi-directionally with the various input devices.

Figure 5B:
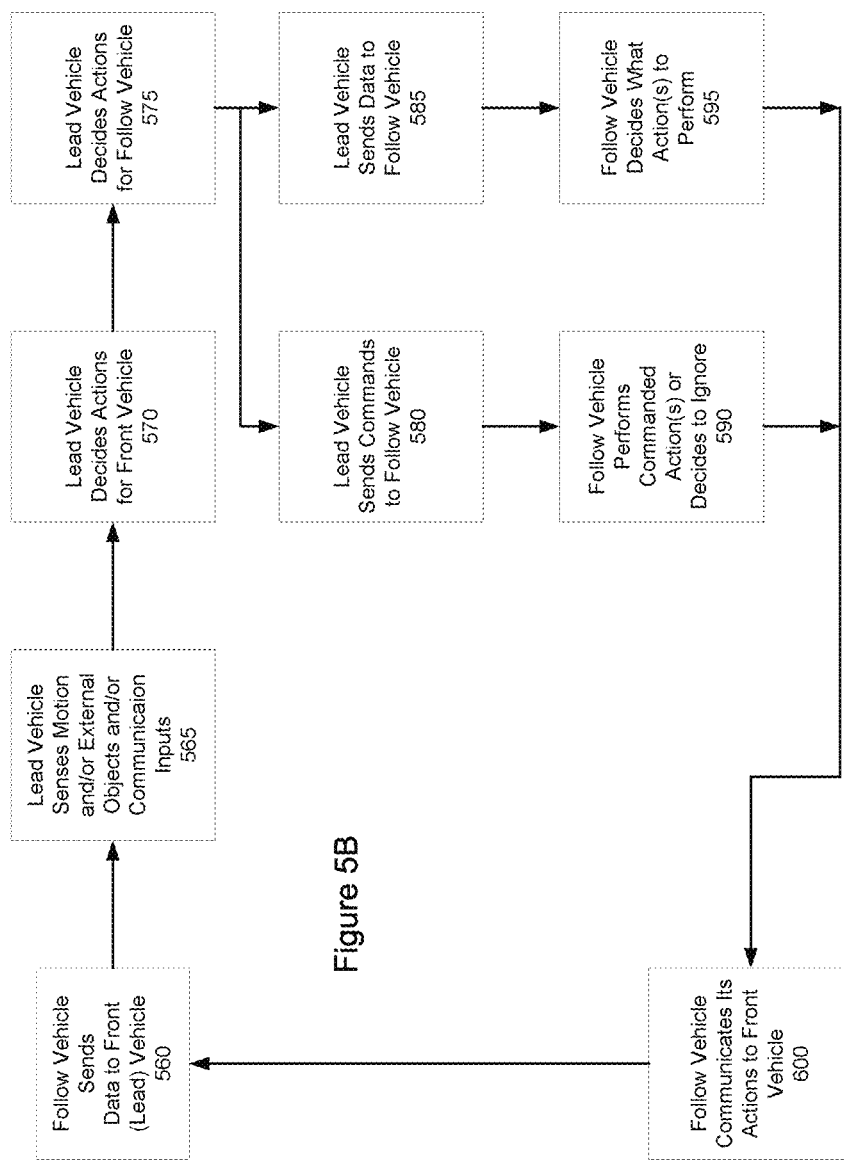
FIG. 5B illustrates in simplified form an algorithm, operating on the onboard vehicle control system of FIG. 5A, by which a lead vehicle issues commands to and receives data back from a proximately-located following vehicle.

The operation of the onboard system, or vehicle control unit, of the present disclosure can be better appreciated from FIG. 5B, which shows, for one aspect, the general flow between the vehicle control units of two linked vehicles. Depending upon the aspect, two modes of operation typically are implemented. In a first mode, the front vehicle's control unit issues commands to the back vehicle's control unit, and those commands are followed in general, but can be ignored in appropriate circumstances, such as safety. In a second mode, the front vehicle's control unit sends data to the second vehicle, advising the trailing vehicle of the data sensed by the lead vehicle and the actions being taken by the lead vehicle. The second vehicle's control unit then operates on that data from the front vehicle to take appropriate action.

In FIG. 5B, at 560, the following or trailing vehicle sends data about its operation to the front or lead vehicle. At 565, the lead vehicle receives the data from the back or trailing vehicle, and senses motion and/or external objects and/or communication inputs (for example, from a NOC or from other vehicles). At 570, the lead vehicle decides upon actions for the lead vehicle and, if operating in the first mode, also decides upon actions for the back vehicle, shown at 575. Then, depending upon whether operating in first or second mode, the lead vehicle either sends commands 580 to the trailing vehicle (first mode), or sends data 585 to the trailing vehicle (second mode). If operating in the first mode, at 590 the second vehicle receives the commands and either performs them or (in some aspects) ignores them. If operating in the second mode, the second vehicle receives the data at 595, and decides what actions to perform. Because the control programs for both units are, in some aspects, the same, in most cases the resulting control of the second (or following or trailing) vehicle will be identical regardless of operating mode. Finally, the second vehicle communicates to the front vehicle what actions it has taken, shown at 600, so that each vehicle knows the state of the other. It will be appreciated by those skilled in the art that the control programs need not be the same for both vehicles in every aspect.

In at least some aspects, the above process is repeated substantially continually, for example, once per second, or more often in some aspects, to ensure that each vehicle has the current state of the other vehicle, and the NOC has current status for both, thus assisting in ensuring safe and predictable operation of each vehicle even when operating in close-order formation at highway speeds.

In addition to the foregoing inputs to the control processor of the onboard system, in some aspects various warnings and alerts can be implemented as inputs to either the control processor or a separate warnings and alerts processor, as described in greater detail in the above-referenced U.S. Pat. No. 9,645,579. Likewise, and also as described in the same U.S. patent, a brake check process can be implemented both to ensure that the vehicle brakes are working correctly and to help determine which vehicle should lead, as in some aspects the vehicle with the better brakes will usually be positioned as the following vehicle, all other parameters being equal.

In at least some aspects, reliably safe platooning involves a collaboration between the NOC and the onboard system. FIG. 6 describes the interaction between the functionalities provided by the NOC and the operation of the onboard system at a high level. For purposes of establishing a platoon, NOC 601, which resides in the cloud in at least some aspects, comprises, in simplified terms, a link finder function 605, a link approver function 610, and a logger function 615. The outputs of the functions are conveyed through a communication gateway 620 to onboard system 625. The onboard system 625 receives from the NOC 601 information about vehicle pairings that the NOC has determined to have platoon potential, followed by platoon authorizations at the appropriate time, indicated at 630. (As used herein, "platoon authorization" refers to an information packet that permits formation and execution of a platoon under specifically prescribed conditions (including, for example, but not limited to platooning partner, platooning order, platooning location, time, and gap between platooning vehicles). In addition, the onboard system receives hazard advisories, indicated at 635, which in general comprise hazards to the vehicle based upon the projected route of travel.

Figure 7A:
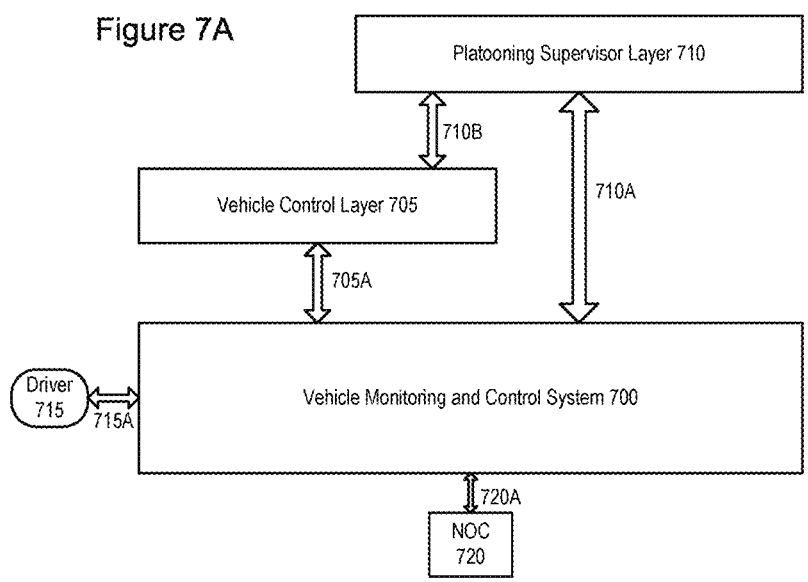
FIG. 7A illustrates in block diagram form the operation of a platooning supervisor system, comprising a vehicle monitoring and control system in combination with one or more software layers, in accordance with one aspect of the disclosure.

In one aspect, the onboard system 625 includes one or more electronic control units, or ECUs, which manage various functions, as described more specifically in connection with FIG. 7A. For the sake of simplicity of explanation, FIG. 6 shows only a data ECU, which provides for message handling and communications management. It will be appreciated by those skilled in the art that the ECU function can be implemented in a separate device, or can be integrated into an ECU which also provides other functions. It also will be appreciated that, in most instances, an ECU as described herein can be a controller or other processor, together with appropriate storage and other ancillaries to execute program instructions of the type discussed in greater detail as discussed herein and particularly beginning with FIG. 7A.

Referring back to FIG. 6, in one aspect, the data ECU 640 manages WiFi interface 645, LTE interface 650, and Bluetooth interface 655, and in turn communicates bidirectionally with a platoon controller ECU 660. The platoon controller ECU in turn communicates bidirectionally with other platoon candidates and members via a DSRC or other short-range communication link 665 (here, termed "V2V" for ease of reference, it being understood that "V2V" connotes various types of short-range intervehicle communications which include, but are not limited to DSRC), and also outputs data to driver's display 670.

In at least some aspects, the onboard ECU communicates with the vehicle's CAN bus 730 which provides connection to a platoon controller 675, log controller 680, and driver interface 685. The ECU 660 also provides the NOC with reports of vehicle position and condition or health, or "breadcrumbs", at a rate that is chosen and may be adjustable based on various factors including location, vehicle or system status, or other factors, as indicated at 697. For example, one sample may be taken within a given period of time, such as once a second. In another aspect, multiple samples may be taken within a given period of time, such as 10 samples once every 10 seconds. In addition, reporting timing need not be related directly to sampling rate. For example, samples at different intervals may be saved and reported as a group. Still further, either or both of the sampling and the reporting intervals may vary depending on platooning status and conditions. In this manner, communications traffic can be handled more efficiently, with bandwidth consumption meeting the platooning situation.

In addition, when a data link with suitable high bandwidth and low cost is available, such as WiFi, the ECU 660 dumps its log to the NOC 601, as indicated at 699. Depending upon the aspect, the log can comprise all data, including video information, or can comprise a subset of that data. For example, in one aspect, the log dump can comprise some or all CAN bus data including SAE J1939 data, some or all radar, lidar, and video data, some or all GPS data, some or all DSRC or other short-range communications data, and some or all status data for both radio systems. In one aspect, the log includes a lot of other data, such as information about internal states of various control systems, as embodied for example in various kinds of inter-process messages which pass between those control systems. The log also may contain other internal system data. Such data may be useful for system analysis, debugging, and problem tracking. It will be appreciated by those skilled in the art that the kinds of data being discussed here need not necessarily be transmitted on the CAN bus, and instead may be communicated via an Ethernet connection, a point-to-point connection, or other suitable communications link. In addition, in one aspect, the NOC 601 will provide platoon authorizations and approvals as communications permit. Based on the information available to the NOC regarding projected routes of travel for individual vehicles, the NOC also will provide hazards as appropriate to those vehicles and their respective routes.

FIG. 7A shows aspects of a system in accordance with the disclosure in a simplified schematic block diagram showing a hardware layer and the software layers that cause the hardware layer to perform the various functions. In particular, Vehicle Monitoring and Control System 700 comprises one or more processors and related hardware as further described in connection with FIG. 7B et seq. The System 700 provides data to and executes instructions from Vehicle Control Layer 705 via channel 705A and also provides data to and executes instructions from Platooning Supervisor Layer 710 via channel 710A. In addition, Platooning Supervisor Layer 710 also communicates with the Vehicle Control Layer 705 via channel 710B. It will be appreciated by those skilled in the art that layers 705 and 710 are software layers, executing on the hardware of the hardware layer shown as System 700.

Figure 7B:
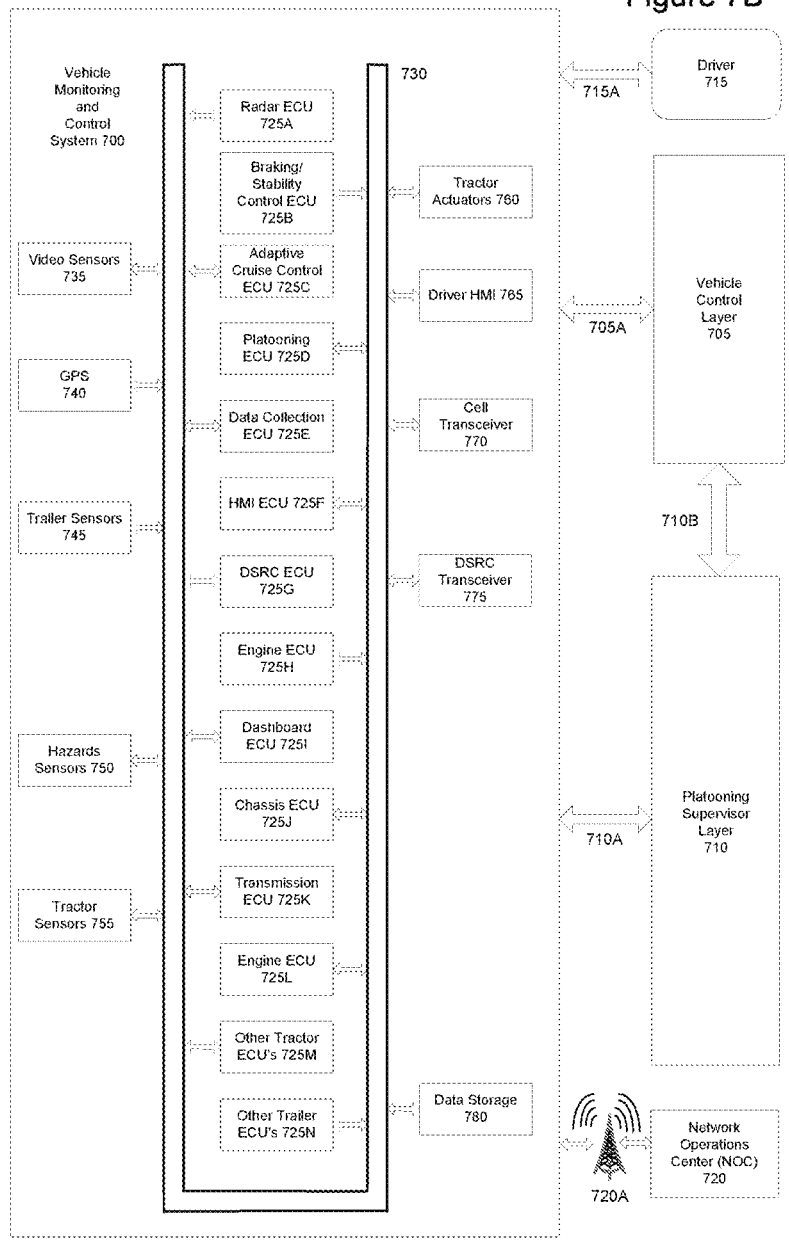
FIG. 7B illustrates in greater detail the processors, sensors and actuators of the vehicle monitoring and control system of FIG. 7A, together with the associated software layers, in accordance with one aspect of the disclosure.

The hardware components that comprise the Vehicle Monitoring and Control System 700, and their interoperation with software layers 705 and 710, can be better appreciated from FIG. 7B. More specifically, in one aspect, the Vehicle Monitoring and Control System comprises one or more Electronic Control Units (ECUs) that receive inputs from various sensors and provide outputs to various actuators and other devices comprising, for example, the driver human-machine interface (HMI) and cell and DSRC transceivers, under the control of the Vehicle Control Layer 705 and Platooning Supervisor Layer 710. The System 700 also communicates with the Driver 715 over a connection 715A. The System 700 also communicates with a NOC 720, usually over a wireless link such as shown by cell tower 720A.

While a single ECU can perform all of the functions necessary in at least some aspects of the disclosure, most modern vehicles have a plurality of ECUs, with each being assigned a specialty. Thus, as shown in the aspect illustrated in FIG. 7B, a plurality of ECUs 725A-725N comprise the core of the System 700 and communicate with one another on bus 730 which can be, in at least some aspects, a CAN bus. Depending upon the particular device being linked, the bus 730 can be a different type of bus or even a point-to-point connection. While FIG. 7B shows a single long bus 730, in the following discussion, it should be understood that there may be a plurality of buses, some of the buses having different communication methods from others of the buses. By way of nonlimiting example, there may be a CAN bus over which several of the ECUs communicate, and a serial bus over which others of the ECUs communicate. There also may be other buses. As a result, in one aspect not all of the ECUs will communicate with each other, nor will all of the ECUs communicate with all of the elements depicted in FIG. 7B. For example, in one aspect data storage block 780 may be accessed only by ECUs which require the data stored therein, or which store data therein (for example, Platooning ECU 725D). As another example, GPS block 740 may be accessed only by ECUs which require GPS data, such as Platooning ECU 725D.

In one aspect, the ECUs 725A-725N, which are merely representative and are not intended to represent an exhaustive list, receive inputs from video sensors 735, GPS device(s) 740, trailer sensors 745, hazard sensors 750, and tractor sensors 755. Depending upon the aspect, fewer, more or different sensors can be used. The bus 730 also permits the ECU's to transmit control signals to tractor actuators 760, to provide data to and receive inputs from the driver via HMI 765, which in one aspect includes input and display hardware or other apparatus to permit easy entry of driver commands, choices, and other inputs, and to manage Cell and DSRC transceivers 770 and 775, respectively. Further, the bus 730 provides a link by which data from the various sensors and ECUs can be stored on Data Storage 780. The various ECU's 725A-N can comprise, among others, Radar ECU 725A, Braking/Stability ECU 725B, Adaptive Cruise Control ECU 725C, Platooning ECU 725D, Data Collection ECU 725E, HMI ECU 725F, DSRC ECU 725G, Engine ECU 725H, Dashboard ECU 725I, Chassis ECU 725J, and Transmission ECU 725K. Other tractor ECU's can also be implemented, as shown at 725M. Other trailer ECU's can be implemented similarly as shown at 725N. The names of these various ECUs signify the ECU functions they perform. There also may be other ECUs controlling, for example, other types of short-range communication, and accompanying short-range communication transceivers. Thus, for example, the DSRC ECU and transceiver may be exemplary of other short-range communication implementations. In addition, it will be appreciated by those skilled in the art that the software comprising the vehicle control layer and the platooning supervisor layer can be distributed across one, some, or all such ECUs.

FIG. 8A shows the Platooning Supervisor Layer and its interaction with the Vehicle Monitoring and Control System 700 in greater detail. Except for the System 700, FIG. 8A illustrates various software functionalities according to an aspect of the present disclosure. HMI 765 interacts directly with the vehicle driver, presents to the driver information from the System 700 as well as from the Platooning Supervisor Layer, and serves as the input mechanism for the driver's commands and choices, for example, selections of a linking partner, or acceptance of an offered link.

NOC Communications Manager 800 establishes and maintains a secure communication link between the vehicle and the NOC, and provides a mechanism for passing messages reliably to and from the NOC. The NOC Communications Manager 800 receives inputs from Vehicle Monitoring function 805, Hazards Monitoring function 810, Software Update Management function 815, and the NOC itself.

The Vehicle Monitoring functionality 805 samples and filters the vehicle state from any of the sources connected to the bus 730, based on requests from the NOC 720. The NOC 720 specifies what information is to be provided, and at what interval, or frequency, and also specifies how the data is to be processed before being communicated back to the NOC. Alternatively, local processing can replace this or other functionality of the NOC. Hazards Monitor 810 "listens" on the Bus 730 for vehicle faults and communicates relevant vehicle faults to the NOC. The Hazards Monitor 810 also receives hazard alerts from the NOC, and, based on its inputs including vehicle status and environmental conditions, makes a local determination on whether to override a platooning authorization. The Hazards Monitor provides an Authorization Override to Authorization Management function 820, and also sends a hazard warning to the driver via HMI Services function 840. Software Update Manager 815 responds to version queries and provides the mechanism by which software on the vehicle can be remotely upgraded.

The Hazards Monitor 810 can locally override a platoon authorization from the NOC 720 in the event a condition is detected which either negates a planned linking, adjusts the platooning distance, or otherwise alters the conditions on which the authorization is based. Such conditions typically include vehicle status problems, or adverse environmental conditions. If the Hazards Monitor override is based upon a vehicle fault or other status issue, that fault or issue is also communicated to the NOC so that the NOC can take it into consideration when evaluating future linking involving the vehicle.

Other conditions leading to a Hazards override can result from issues external to the vehicle itself, such as weather, traffic, or road conditions that other vehicles communicate. Depending upon the aspect and the particular condition, another vehicle can communicate information about the external issue to the NOC, and then to the vehicle receiving the platoon authorization. Alternatively, the other vehicle can communicate the information directly to the vehicle receiving the platoon authorization. In either case, the onboard system passes the hazard information to the Hazards Monitor 810, which takes appropriate action to either cancel or modify the authorized linking.

In the absence of an override from the Hazards Monitor 810, the Authorizations Manager 820 receives and interprets authorization packets from the NOC, via the NOC Communications Manager 800, in combination with absolute position, speed and heading information from the Vehicle Position Tracking function 825 (which in turn receives that information from the vehicle monitoring and control system 700) to help determine the proximity of the platooning partners proposed by the NOC, as discussed in greater detail herein. The Authorizations Manager 820 sends to the System 700 a platoon authorization status message together with a time to transition, i.e., a time at which the platooning partner is proximate and linking can begin. The Authorizations Manager 820 also sends an identification of the selected platooning partner to Inter-vehicle Communications Management function 830, and, in some aspects, sends to an Approach Guidance function 835 information regarding the selected platooning partner, its position, and guidance for platooning.

The Inter-vehicle Communications Manager 830 manages the mutual authentication of the platooning partners by providing security credentials to the System 700, typically communicated over a DSRC link. In aspects having approach guidance, the Approach Guidance function 835 operates in two modes.

In one mode, when the partner vehicle is outside DSRC range, the Approach Guidance function 835 provides approach guidance directly from the NOC, if such guidance is available. In a second mode, once a secure communications link with the platooning partner has been established, over a DSRC link in at least some aspects, the Approach Guidance function 835 provides local approach guidance independent of the NOC, using position and speed information provided by the partner vehicle together with local vehicle tracking information, such as radar tracking status received from System 700 and data from Vehicle Position Tracking function 825.

Depending upon the aspect, the guidance can comprise supplying the driver with none, some, or all of mapping, video and radar inputs, lane alignment, and any other data available from the system. In some aspects, the driver manually uses such data to position the vehicle for platooning, at which point the platooning controller engages and brings the vehicles to the desired platooning gap.

HMI Services function 840 provides the semantic layer for interaction with the driver of the vehicle, and converts status information from the vehicle, including the software layers, into relevant messages to the driver. In addition, the HMI Services function 840 processes inputs from the driver. The HMI Services function 840 provides presentation data to the Vehicle Hardware for display to the driver on the Driver HMI 765. For the driver of the following vehicle, the display typically includes a video stream of the forward-looking camera on the lead vehicle.

The foregoing description of FIG. 8A mentions certain functionality with reference to software. Firmware and hardware alternatives are possible as well. The interaction of one or more of the just-described functionalities results in improved overall hardware operation through, among other things, communication of a number of described inputs from potential platooning vehicles and/or the NOC to provide superior platooning capability and control which manual control cannot match.

Figure 8B:
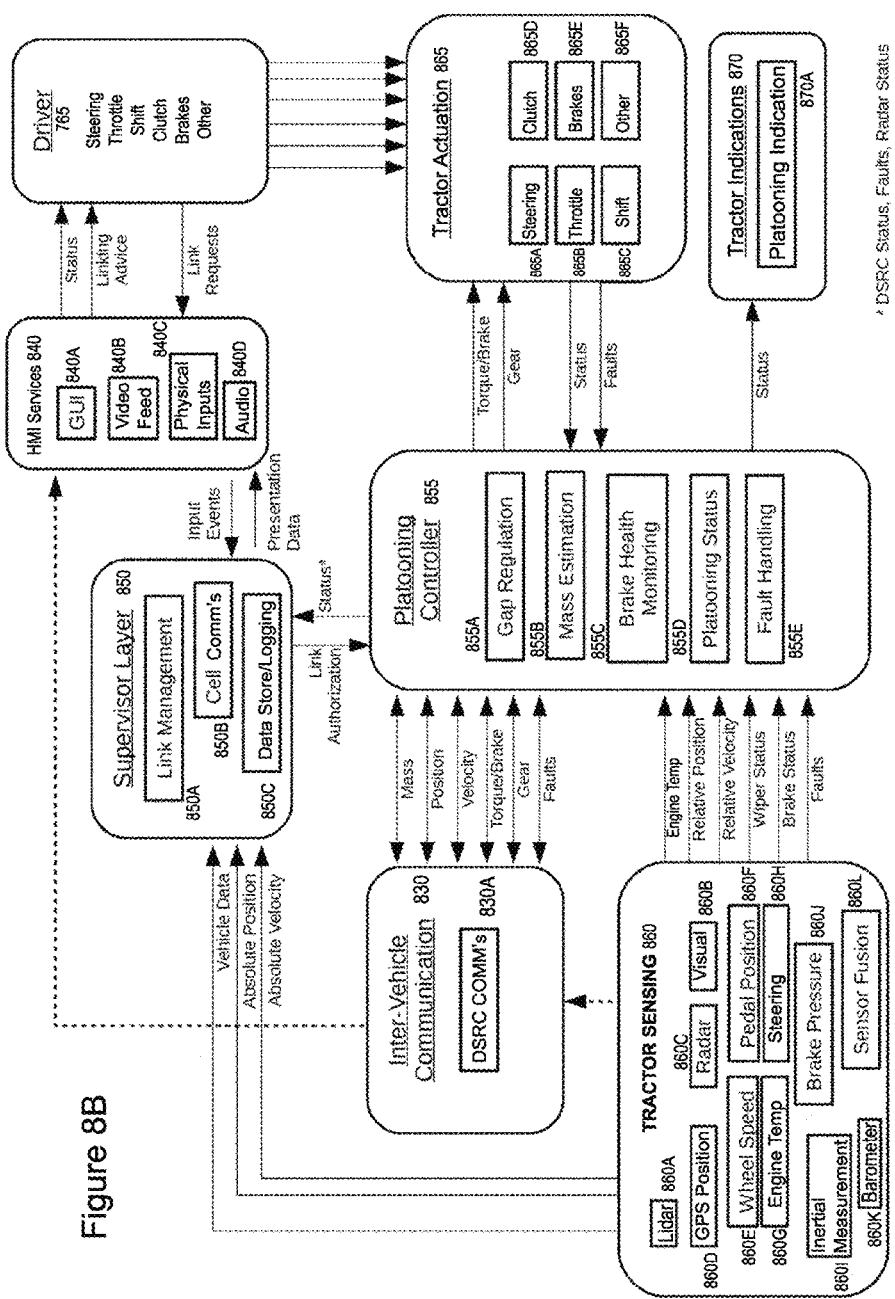
FIG. 8B illustrates, from a software functionality perspective, the operation of the vehicle control system in accordance with one aspect of the disclosure.

FIG. 8B provides some further aspects of the software functionalities described above with reference to FIG. 8A in the context of the software functions of the system as a whole. As in FIG. 8A, the Inter-vehicle Communications function 830, which includes management of DSRC Communications 830A, sends messages to HMI Services function 840, which provides an interface to the Driver function 765, Inputs from the Driver function 765 include link requests based on the driver's selection of a platoon partner. It will be appreciated that multiple potential platoon partners will exist on many routes, thus giving the driver multiple options. However, in some aspects and for some fleets, the platoon partner choices will be determined at fleet operations, for example where multiple vehicles routinely follow the same route to the same or nearby destinations. In such instances, the driver has the option either to accept the link or to reject it.

The HMI Services function 840 also provides to a Supervisor Layer 850 input events received from the driver, and receives presentation data from the Supervisor Layer 850. The HMI Services function 840 comprises, in one aspect, a GUI 840A, video feed 840B, physical inputs 840C, and audio inputs and outputs 840D. The Supervisor Layer 850 includes a Link Management function 850A, cellular communications management function 850B, and data store and logging function 850C.

The Supervisor Layer 850 also sends Platoon Authorizations to a Platooning Controller function 855, and receives from that controller status messages including DSRC status, faults, and radar status. The Platooning Controller 855 includes various functions, including Gap Regulation 855A, Mass Estimation 855B, Brake Health Monitoring 855C, Platooning Status 855D, and Fault Handling 855E. Gap regulation 855A can involve setting a separation distance between the lead and the following vehicle, or can involve setting a time headway from the back of the lead vehicle to the front of the following vehicle. In either event, the objective is to ensure that the separation distance provides acceptable fuel economy benefits while at the same time ensuring the safety of both vehicles.

To perform the foregoing functions, the Platooning Controller 855 receives inputs from the tractor representing status of various tractor functions, shown generally at Tractor Sensing 860. In one aspect, those functions include Lidar 860A, Visual 860B, Radar 860C, GPS position 860D, wheel speed 860E, pedal position 860F, Engine Temperature 860G (sensed either from the engine block, the engine bay, or another suitable location), steering 860H, inertial measurement 860I, brake pressure 860J, barometer and related weather sensing 860K, and combinations of such sensed data indicated as sensor fusion 860L. Other data, such as fuel level or remaining driving range, also is provided in some aspects.

The Platooning Controller 855 communications bi-directionally with the Inter-vehicle Communication module 830 regarding mass, position, velocity, torque/braking, gear and faults. More specifically, the Platooning Controller 855 receives, via the DSRC link, data about the other vehicle including mass, position, velocity, torque/brake status, gear, and faults. The Platooning Controller 855 uses these inputs to provide the status data to the Supervisor Layer 850, as mentioned above, and also provides torque and brake commands, and gear. In the absence of a gear sensor, gear selection can be calculated for manual or automatic transmissions based on engine speed and tire rotation speed. Gear on automatic transmissions also can be sensed directly from the Transmission ECU 725K in FIG. 7B, for example.

The Platooning Controller 855 also receives status and fault information from a Tractor Actuation function 865, which, in an aspect, comprises steering 865A, throttle 865B, shifting 865C, clutch 865D, and braking 865E, as well as other driver-controlled actions 865F such as a fake brake, etc. In at least some aspects, the driver (function block 765) can provide all of such inputs to the Tractor Actuation block 865, although both braking and throttle are under the control of the Platooning Controller 855 during linking and while platooning. In some aspects, a Tractor Indication function 870, comprising a Platooning Indication 870A, also is provided. Tractor Indication function 870 controls a physical indicator, positioned on the tractor and visible to other vehicles proximate to the platoon. The physical indicator typically is enabled when a platoon is formed, and also can be enabled during the linking process. Depending on the state of platooning, the physical indicator can indicate whether the vehicle is not platooned; is available for platooning; is in the process of platooning; or is platooning.

As was the case with FIG. 8A, the foregoing description of FIG. 8B mentions certain functionality with reference to software. Similarly to FIG. 8A, firmware and hardware alternatives are possible as well. The interaction of one or more of the just-described functionalities results in improved overall hardware operation through, among other things, communication of a number of described inputs from potential platooning vehicles and/or the NOC to provide superior platooning capability and control which manual control cannot match.

Figure 9:
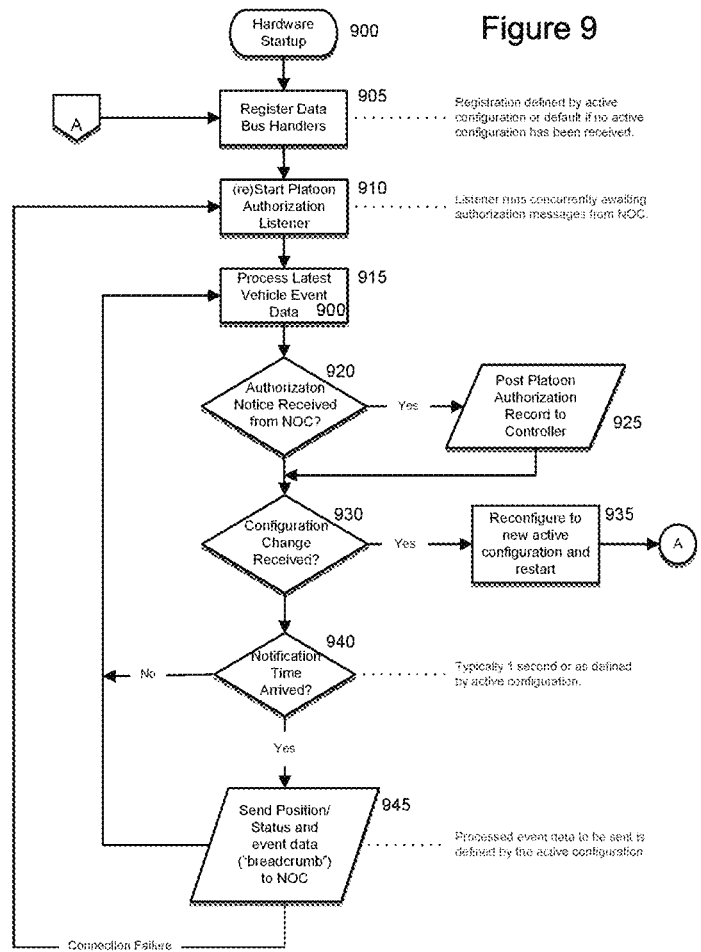
FIG. 9 illustrates in flow diagram form one aspect of a vehicle data processing main loop in accordance with one aspect of the disclosure.

FIG. 9 illustrates data processing which occurs on the vehicle. When the vehicle is started, the hardware starts up at 900. Data Bus handlers are registered with the system at 905, using either a default configuration or, if a configuration has been received from the NOC and is active, using that active configuration. At 910 a platoon authorization "listener" is started, whose function is to listen for platoon authorization messages from the NOC.

Next, at 915 the latest vehicle event data is processed, after which a check is made at 920 to see whether a platoon authorization notice has been received from the NOC. If so, at 925 the authorization record is posted to the controller by a software interface such as an API. If no platoon authorization has been received, a check is made at 930 to determine whether a configuration change has been received from the NOC. If so, at 935 the new configuration is implemented, changing the type of data that is collected from the vehicle and reported to the NOC in a "breadcrumb" message, and a restart signal is sent to cause a loop back to 905 where the data bus handlers are re-registered in accordance with the new configuration.

If no new configuration has been received, the process advances to 940, where a check is made to see whether sufficient time has elapsed that position and status information are due to be sent to the NOC. If not, the process loops back to 915. If so, the position and status information, or "breadcrumb" message, is sent to the NOC. The frequency at which such breadcrumb messages are sent to the NOC is, in at least some aspects, defined by the configuration parameters received from the NOC, which parameters also define the event data that is to be sent to the NOC as part of the message. In at least some aspects, the "breadcrumb" message is reported to the NOC regularly, for example once per second. In addition, when appropriate, an "I am available for platooning" message is also sent regularly to the NOC.

The foregoing discussion of FIG. 9 has included references to "breadcrumbs" transmitted from potential platooning candidate vehicles to the NOC, and to "authorizations" transmitted from the NOC to those potential platooning candidate vehicles. Various types of data have been indicated as suitable "breadcrumb" data or as "authorization" data.

According to aspects of the present disclosure, breadcrumb data can include some or all of the following:
  a. GPS fix information (e.g. latitude, longitude, altitude)
  b. Quality of GPS fix
  c. Absolute time in GPS frame of reference, optionally including, in one aspect, the coordinated universal time (UTC) of a clock onboard the vehicle
  d. Vehicle route
  e. Vehicle heading
  f. Destination
  g. Forward speed
  h. Altitude gain or loss (speed up or down)
  i. Platooning flag (whether the vehicle currently is platooning)
  j. Platooning availability (whether the vehicle is available for platooning)
    i. In some aspects, platooning availability may take the form of a polling request to the NOC. If/when the NOC responds to the polling request, the transmitting vehicle may then communicate some or all of the data being discussed herein
  k. Vehicle characteristics, including one or more of weight, dimensions, and fuel consumption, equipment type (brakes, engine, model, etc.)
  l. Vehicle condition, including vehicle age, mileage, brakes, transmission, engine temperature, and other conditions which onboard ECUs may provide (see FIG. 8)
  m. Odometer reading (according to one aspect; where GPS data is available, that data may be equally reliable, if not more so)
  n. Driver status (how long the driver has been behind the wheel, how much time has elapsed and/or is remaining in the drivers shift, timing of any required breaks), driver identity (driving record)
o. Load information: Customer, load type, timing of load (such as important for temperature)

In the foregoing list, information such as vehicle route, heading, and destination may be known to the NOC already, and so may not need to be included in the breadcrumb data. Moreover, since this kind of information does not tend to change more than incrementally, it may not be necessary to include this data repeatedly, instead saving overhead by sending the data less often. In addition, platooning availability (paired, or unavailable, versus unpaired, or available) also may be known to, and even controlled at the NOC, so that such data need not be part of the breadcrumb data. In some aspects, the driver(s) may indicate availability to the NOC, or the NOC may make its own determination based on data it has, and data it receives via the breadcrumbs.

The NOC can receive the breadcrumb data, and can provide authorization data in return. In one aspect, the NOC only provides authorization data to vehicles that indicate their availability for platooning.

According to aspects of the present disclosure, authorization data can include some or all of the following:
a. Weather data, including precipitation and wind
   i. In different aspects, the NOC may obtain weather from various sources, including the National Weather Service, for example
   ii. In the course of overlaying weather data on highway data, the NOC may reformulate or recharacterize the weather data to facilitate the overlaying. In one aspect, data according to county or other geographical zones may be used
b. Road condition data (responsive, in one aspect, to GPS data as part of received breadcrumb data)
   i. According to different aspects, this data may include road geometry (altitude changes, absolute position, road grades, road width, curves, and the like), traffic, flooding, icing, other slipperiness based for example on local precipitation, and road construction
      1. Road geometry may be identified with identifiers for fixed sections of roadways, in lieu of mileposts or other distance posts which vehicles pass as they drive
      2. In different aspects, the NOC may obtain traffic information from different sources, including Inrix™ or Google™, for example
      3. GPS data may provide latitude and longitude information from which road geometry may be derived. The latitude and longitude information may be part of the authorization data.
c. Road regulatory information, such as indications of whether and where platooning or other similar activity is allowed, may come into play, as can speed limit. Different states may have different regulations
d. Identity and location of potential platooning candidates
   i. According to different aspects, these candidates may be part of the same vehicle fleet, or may be in different fleets, from the same or from different companies. In the latter case, the NOC may have information about various different fleets and their capabilities
   ii. Where the authorization data identifies multiple candidates, the vehicles may have an option of choosing one or another candidate as a platooning partner
   iii. In different aspects, identity data may include specific identifying information, by vehicle number or the like, of the platooning candidates
e. Other data regarding potential platooning candidates
   i. According to different aspects, this information can include ways to communicate with the candidates (e.g. DSRC, LTE, or another method)
   ii. Where secure communication is important, this information can include appropriate public encryption keys
f. Where a vehicle is in the process of platooning, an indication of whether the vehicle should be the lead vehicle or the following vehicle. The NOC may make this determination based, in some aspects, on the respective conditions, weights, and the like of the lead and following vehicles. Once the lead v follow determination is made for a particular platoon, normally that relationship will be maintained for as long as the platoon is in existence. Driver status, including length of time on shift, also may play a role in the NOC's instruction regarding status of a vehicle as leading or following
g. An indication of proper gap between the lead and follow vehicles
h. Instructions to slow down or speed up in order to facilitate platooning (these may be considered part of a rendezvous process, discussed herein)
   i. In some aspects, these instructions may not be necessary. Instead, the vehicles that are in the process of platooning can determine on their own whether acceleration or deceleration or, in some aspects, route diversion or variation would be necessary in order to effect platooning
   ii. Where the NOC issues data indicating which vehicle should lead and which should follow, the vehicles may use this data to effect acceleration or deceleration as appropriate, as well as route diversion or variation
i. Preferred starting and ending points (e.g. mile markers on a highway) for platooning, including, where applicable, points of initiation, termination, and resumption of platooning
j. Timing and/or location data regarding availability or unavailability of platooning candidates, including data regarding windows of opportunity for platooning
   i. In some aspects, there may be areas within a given amount of time or distance, in which platooning alternately is appropriate (permitted) or inappropriate (not permitted)
   ii. Depending on what this data indicates, platooning may be permitted to start, or to continue, or may be prohibited in part or all of the timing and/or location windows
k. Time limits for platooning authorizations, including a counter indicating remaining time in a platooning window of opportunity In one aspect, authorization from the NOC to one of the vehicles forming a platoon is provided in the form of a sequence of bits in one or more information packets. The authorization sequence from the NOC may go to either or both of the vehicles in the platoon to be formed. By way of non-limiting example, one such authorization sequence may be as follows:

Version number. This may be used for any number of purposes, including one or more of: i) indicating to the receiving party that the software version of the originating entity matches (is compatible with) the software version on board the receiving vehicle; ii) forming part of the encryption for the overall sequence (e.g. as part of a key used to verify the accuracy of the authorization sequence)

Validity window. This may include any of a creation date/time, an effective date/time, a refresh date/time, and an expiration date/time. The validity window signifies when the authorization sequence should be in force. In one aspect, this may have some significance because of the limited duration of viability of a platoon to be formed. If the authorization sequence is too old (received too late), it may be too late for the effort of platoon forming to be worthwhile.

Partner information. This data may describe the partnering vehicle with which the vehicle receiving the authorization sequence will platoon. In one aspect, the data may include: i) fleet identification (this may indicate whether the platooning vehicles are in the same fleet; in one aspect, being in the same fleet may be a platooning requirement, but in other aspects, interfleet platooning may be acceptable, among vehicles of certain fleets); ii) vehicle identification; iii) MAC address for communicating data with that partnering vehicle; iv) real-time communications channel and offset; v) non real-time communications address and channel; vi) push-to-talk session id and server IP address.

Relative position. This data may include: i) separation between the partnering vehicle and the receiving vehicle; ii) partner speed; iii) milepost at which the partnering vehicle is located; iv) milepost at which the receiving vehicle is located; v) platooning authority (one or more bits signifying acceptability of platooning); vi) milepost at which the platoon should end; vii) distance (for example, in miles) to the end of the platoon authorization.

Highway identity. This data may include such information as highway number, direction of travel, and state in which the highway is located. For example, interstate highways and US routes often go from state to state. There may be different platooning rules and regulations in different states. If the platoon is to be authorized to go between states, the highway number may or may not change, but the state might. If a state permits platooning on state or county highways, the highway number might or might not change between counties.

Segments authorized for platooning. This data may include such information as relative location between vehicles which will be platooning; mile markers indicating the start and end of one or more segments in which platooning is authorized; mile markers indicating the start and end of one or more segments in which platooning is not authorized; and minimum and/or maximum gap between lead and following vehicles in the platoon to be formed.

Highway shape and physical location. This data may include successive geographic coordinates (for example, starting and ending latitude and longitude for one or more authorized platoon segments), along with other data. For example, for a given authorized platoon segment, if there is starting and ending milepost data, and starting and ending latitude and longitude data, plus one piece of information such as cosine longitude, other information such as sine longitude, sine latitude, and cosine latitude, may be calculated and thus yield information on shape of the highway segment(s) for which platooning is being authorized.

An Appendix at the end of the present application contains some sample code to implement the authorization described in the preceding paragraphs.

In one aspect, the partnering vehicle may receive an authorization sequence, similar to that of the receiving vehicle, but containing information pertaining to the receiving vehicle rather than the partnering vehicle.

For the sake of security, in one aspect the authorization sequence may be transmitted in encrypted form, using any of a number of types of known encryption, including public-key or private-key encryption.

In one aspect, one of the vehicles in the platoon that is forming may be the source of the authorization sequence. The vehicle that is the source of the authorization sequence may have access to the same kind of data that the NOC would have, in order to acquire the necessary authorization data, of the type outlined above, for example, and provide it to a vehicle with which a platoon is to be formed.

Vehicles looking to platoon may do so under authorization of the NOC, being guided by the authorization data, or on their own, or on a basis that uses both local vehicle data and authorization data from the NOC. Where potential platooning vehicles rely in whole or in part on data coming from the NOC, there should be allowances for transmission latency, communication faults, and the like.

In some aspects, the NOC will draw on data from different fleets, including, for example, but not limited to fleet routes and hours, fleet histories, different safety thresholds (particularly in potential interfleet platooning situations)

The amount and periodicity of breadcrumb data and authorization data should be sufficient to permit platooning where conditions permit. In some aspects, data density and data costs may motivate less dense and/or less frequent data communication. In some aspects, a NOC may be able to handle breadcrumb data from a number of vehicles, for example, from 1000 trucks every second, or every ten seconds. In other aspects, a NOC may be configured with multiple servers to receive breadcrumb data with complete or partial redundancy, or completely separately (with breadcrumb data being broken into segments which go to different respective servers at the NOC). Such redundancy and/or splitting can improve reliability and continued operation in the event that one or more servers goes out of service for some reason.

Figure 10:
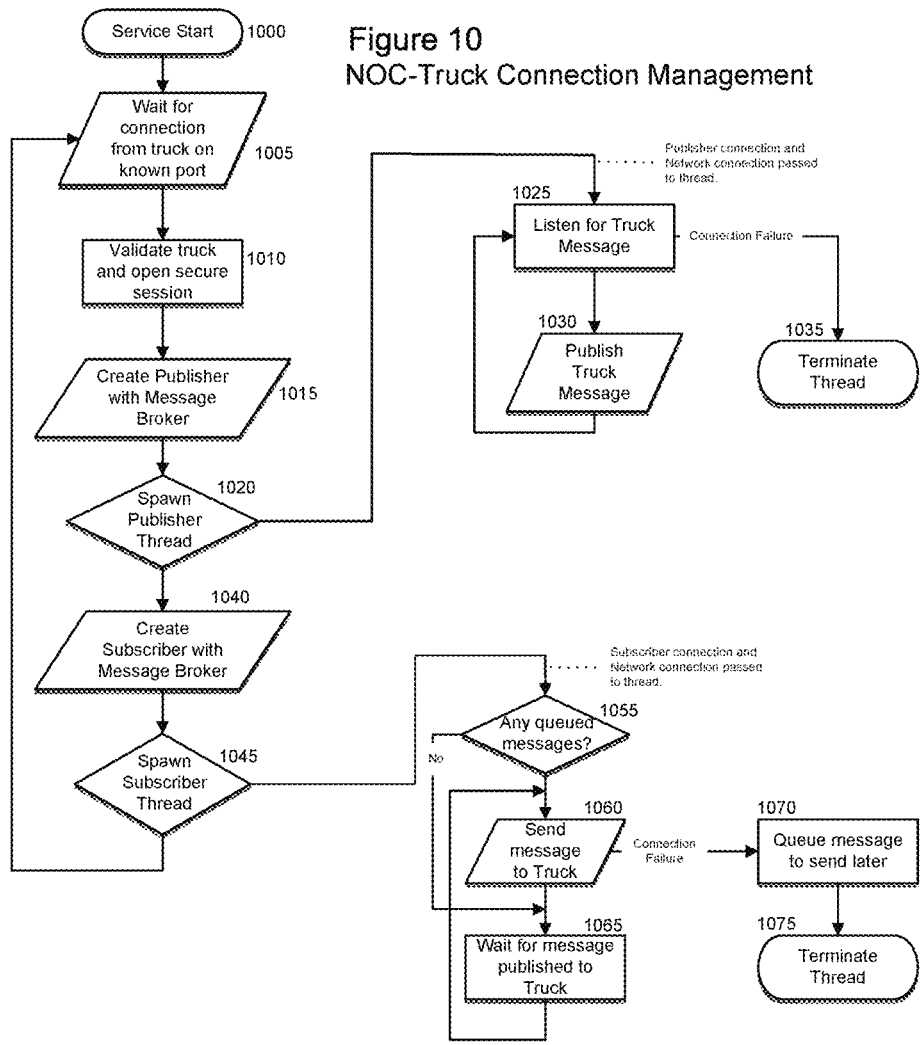
FIG. 10 illustrates in flow diagram form one aspect of NOC-vehicle communications management.

FIG. 10 illustrates a process for managing connections between the NOC and the vehicle according to one aspect. Service at the NOC starts at 1000. At 1005, the NOC waits for a connection from a vehicle on a known port. At 1010, the NOC validates the vehicle and opens a secure session, and then at 1015, creates a publisher message with a message broker functionality. A publisher thread is then spawned at 1020, at which point the publisher connection and the network connection are passed to the thread. The thread listens for a message from the vehicle, for example a "breadcrumb" message or an "I am available for platooning" message, shown at 1025. Once a message is received from the vehicle at 1030, the process loops and the NOC returns to listening mode at 1025. If no message occurs within a given time window, the thread terminates at 1035.

Following the spawning of the publisher thread, and essentially in parallel with the execution of that thread, at 1040 the process creates a subscriber message with a message broker. A subscriber thread is then spawned at 1045, and the subscriber connection and network connection are passed to the subscriber thread as shown at 1050. A check is made for queued messages at 1055, and any queued messages are sent to the vehicle at 1060. If there are no queued messages, or if the queued messages have been sent, the process advances to 1065 and waits for the message to be published to the vehicle. The process then loops back to 1060. In the event that the message could not be sent to the vehicle at 1060, typically as the result of a connection failure, the messages are queued at 1070 and the thread terminates at 1075.

In one aspect, a message queue need not be maintained, so that 1055-1070 may be omitted. For example, while a history of breadcrumb data may be useful for recordkeeping and data mining purposes, when looking at creating authorizations, only the latest authorization really matters to the system, and to the drivers.

Similarly, from the perspective of delivering authorizations, only the most recent authorization really will matter to a driver, so that an ability of the driver to access or poll for the most recent authorization (via a service, or through storage access) is what needs to be provided.

In one aspect, connection between a NOC and a vehicle depends on the vehicle maintaining the connection. Depending on the mode of connection, there could be an unexpected drop. For example, long-term evolution (LTE) connections can drop unexpectedly. In such a circumstance, if there is a failure, the NOC will queue pending messages, and will wait for the vehicle to reestablish communication with the NOC before sending them. In this way, proper operation can be maintained. This aspect differs from aspects described above with reference to FIG. 3, in which vehicles out of communication with the NOC can pass their messages, including log data, to other vehicles which do have communication with the NOC.

Figure 11B:
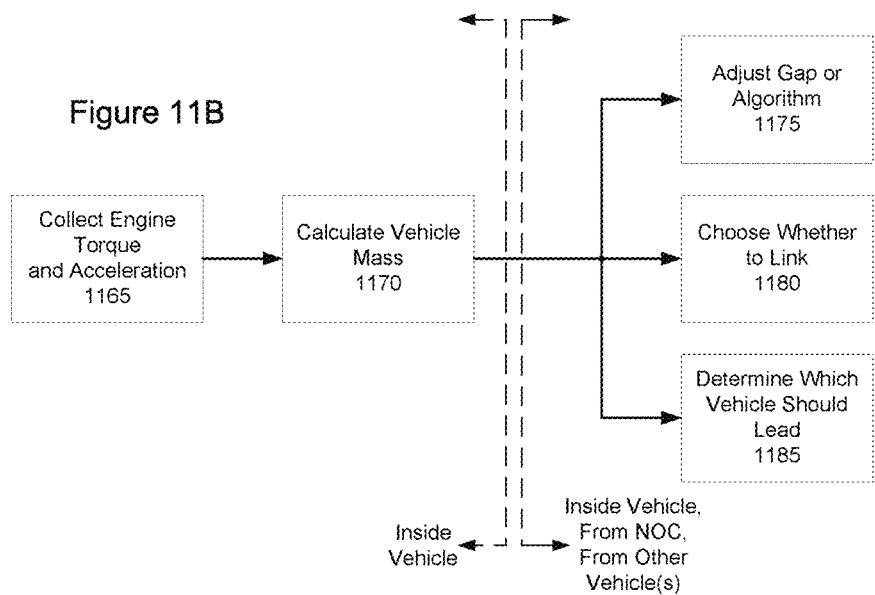

FIGS. 11A and 11B illustrate the process of coordination and linking to form a platoon. FIG. 11A shows one aspect of the coordination and linking functionality, indicated generally at 1100. After the process starts at 1101, a set of platoon-capable pairings is received. The set of pairings is, in at least some aspects, received from the NOC and comprises a list of potential platoon partners. Depending on the availability of other vehicles, or on the fleet's priorities, the driver may be presented with only a single platooning choice that the driver can either accept or reject. Alternatively, in some aspects and for some vehicles, the identification of platoon-capable partners can be generated locally. In either event, authentication keys are provided to enable secure communications between linking partners. Thereafter, at 1110, either the driver or the system identifies a vehicle available for coordination as a platooning partner, and a platooning offer is communicated as shown at 1122, indicated in some aspects by a self-acceptance message.

In either approach, at 1124 the other vehicle (the "far" vehicle) can then accept, meaning that the pair has agreed to coordinate for possible linking as shown at 1130. Depending on vehicle positioning, weight of load, vehicle equipment, and other factors, a vehicle within linking range may be identified as a Following Vehicle Available for Linking 1142 or as a Leading Vehicle Available for Linking 1144. If neither of these is the case, the system returns to coordination mode. Once a Following Vehicle Available for Coordination has Accepted the link, 1152, and the Self Vehicle also accepts the link, 1153, (in any order), the link is initiated. Upon completion of the link, the vehicles are now linked at 1162. Similarly, once a Leading Vehicle Available for Coordination has accepted the link, 1154, the Self Vehicle then also accepts the link, 1155, (again in any order) initiating the link. Upon completion of the link, the vehicles are now linked as shown at 1164.

To properly determine not only which vehicles are appropriate for linking, but also which vehicle should be the lead vehicle and which the following, certain vehicle characteristics are important. One aspect is shown in FIG. 11B, where the characteristics of engine torque and acceleration are collected internally to the vehicle at 1165, and vehicle mass is calculated at 1170. That information, which can be processed locally or at the NOC, is then used to adjust the gap between the vehicles, or to modify the algorithm, as shown at 1175. In addition, the data can be used to choose whether to link, 1180, although other factors can also be considered in at least some aspects. Other factors can include, for example, the proposed distance of the platoon, time duration, time of day, hours of service and related restrictions, fuel level and driving range, refueling possibilities, service level agreement issues, the need for the vehicle to be at a destination at a given time for further use or maintenance, driver meals and relief breaks, driver satisfaction, driver pay, traffic rules and regulations, etc. If a link is to be made, one or more of the factors can assist in informing the decision on which vehicle should lead, as 1185 indicates.

In a number of circumstances, physical characteristics of vehicles and possibly of their drivers will be sufficiently different that the identification of leading versus following vehicle will be clear. However, in some circumstances vehicles may have similar weights, similar braking characteristics, similar power-to-weight ratios, similar ages, similar tire life, and the like; or drivers may have similar ages, driving records, time on the road, and the like. Under one or more such circumstances, in one aspect the drivers would decide platooning order. So, for example, for two vehicles A and B that are going to platoon, there would be four possibilities: A lead, B follow; B lead, A follow; driver choice; or no platooning.

Before a platoon can be formed, and even before potential platooning partners can be identified, the route for a vehicle available for platooning must be known at least in part. This can be accomplished by generating a vehicle travel forecast, as shown in FIG. 12. The process there starts by receiving position information for a vehicle, designated Vehicle A, at 1200. The position information can comprise longitude/latitude information, or a coordinate pair plus speed and heading, or a series or trail of coordinate pairs. A GPS device, as described in the foregoing figures, is suitable for providing such information.

The process of FIG. 12 continues by checking at 1205 to determine whether Vehicle A's route is known. In many instances, vehicles such as large commercial trucks travel routes that are repeated frequently, or are set by a fleet manager or other supervisor. As a result, in many instances a particular vehicle's route is known and stored in a database, typically maintained at a NOC and, in at least some instances, also available locally.

If, however, Vehicle A's route is not known, a search is made at 1210 for nearby routes that would be acceptable for platooning. The process of identifying such routes will discussed in greater detail in connection with FIGS. 14A-14B and 15A-15C. In the course of the search, a driver may be provided with multiple feasible choices, using criteria such as histories of previously-traveled routes for the truck or the driver, or for other trucks or drivers in the same or related fleets, or other criteria such as weather, traffic, road construction, and the like.

After the search at 1210, a check is made at 1215 to determine if there is at least one platoonable route, suitable for use by Vehicle A. If there is not at least one platoonable route, the process stops for the time being, as shown at 1220. However, in most instances there will be at least one platoonable route. Accordingly, at 1225 a determination will be made as to where and when it is feasible for Vehicle A to join the platoonable route. Then, at 1230, Vehicle A's route start location and time is used together with Vehicle A's expected speeds, to calculate, in the NOC or in the Vehicle Monitoring and Control System 700, minimum and maximum times for Vehicle A's arrival at specific waypoints on the identified route. Based on those calculations, a travel forecast for Vehicle A is then generated in either a local or remote process, as shown at 1235. In addition to the factors discussed above for developing a travel forecast, one or more of the factors discussed in connection with FIG. 11B, above, are also considered in formulating the travel forecast for some aspects. The travel forecast, which is stored at the NOC in at least some aspects, can then be used to search for potential platooning partners, as will be discussed in connection with FIG. 13.

Going back to 1203, if Vehicle A's route is known, then at 1240 the route information is fetched from the database of known routes. Then, at 1245, Vehicle A's position is then compared to the known route. If Vehicle A is off route, a determination is made at 1250 as to where and when it is feasible for Vehicle A to rejoin the expected route. At 1255, if rejoining is determined feasible, the process loops back to 1230 to provide Vehicle A with appropriate guidance for rejoining the route, followed by generation of a travel forecast. If it is not feasible for Vehicle A to rejoin the route, the process terminates, for the time being, at 1260. A termination at either 1220 or 1260 is temporary, since platooning possibilities change as Vehicle A's position on its route changes and, in at least some aspects, vehicles report their changed position via breadcrumb messages.

Once a travel forecast has been generated for Vehicle A, it is possible to search for potential platooning partners. One aspect for such a search and linking process is shown in FIG. 13, which can be seen to elaborate in some respects on the process shown in FIG. 11A. The process of FIG. 13 begins at 1300 with the receipt of a platoon request from Vehicle A. The request is received at a processor, located in the NOC in at least some aspects but potentially located elsewhere in other aspects. At 1305, a travel forecast, such as one that results from the process of FIG. 12, is then either generated or retrieved. At 1310, a search of the travel forecasts stored in a database 1315 at the NOC is made to identify other stored forecasts with similar routing and timing. Based on those similar routings, a list of potential platoon partners is generated in the processor.

Occasionally, no potential platoon partners will be identified by the search, in which case a check made at 1320 results in a "no". In such an event, Vehicle A's travel forecast is added to the database 1315 if not already stored, and the driver is informed that no platooning possibilities currently exist. In most cases, however, one or more potential platooning partners will be identified, such that a "yes" results from the check at 1320. In that event, a list of potential partners is sent to Vehicle A, as shown at 1330. Depending upon the aspect, a platoon offer can also be sent concurrently to the identified potential partners, B1, . . . , Bn, as shown at 1335.

In some cases, and as shown at 1340, the driver selects from the list provided in 1330, and a platooning offer is sent only to those partners selected by the driver of Vehicle A. In some aspects, the fleet operator determines the potential pairings and the driver receives only one choice, which can either be accepted or rejected. At 1345, Vehicle A's selection is retrieved, typically indicated by a manual or audible command from the driver. The responses from the potential partners, for example Vehicle B1, are shown at 1350. (In the following discussion, the partners are A and B1, but A's partner could be any of B1, . . . , Bi, . . . , bn.) A check for acceptance of the platooning offer is made at 1355. Should there be no acceptances, then at 1325 Vehicle A's travel forecast is added, if not already stored, to the current travel forecasts database 1315.

In most cases, Vehicles A and B1 agree, in which case the process advances to 1360 where, in most cases, the NOC sends platoon approval, as discussed above in connection with FIG. 8A-8B, together with advice for the respective rendezvous actions to be taken by Vehicles A and B1. In addition, at 1365, the travel forecasts for Vehicles A and B1 are removed from the database of current travel forecasts, since neither is currently available for platooning. In some aspects, platoons of more than two vehicles are permitted, in which case the travel forecasts of Vehicles A and B1 are maintained in the database of current travel forecasts.

Following approval of the platoon, at 1370 the NOC monitors the positions of vehicles A and B1, including during formation of the platoon and thereafter. In addition, at 1375 the NOC monitors road and other conditions such as traffic, weather, construction, and the like, to identify conditions relevant to the platoon of Vehicles A and B1, and provides alerts to both drivers as well as providing relevant data or commands to the onboard systems for each vehicle. In one aspect, such monitoring continues at least until the platoonable routing is completed, 1380, or one of the drivers disengages, 1385, after which the process stops at 1390. In another aspect, monitoring will continue because driver disengagement is temporary (for example, when another vehicle comes between the lead and following vehicles in the course of a multiple lane change, the follow driver may decide to apply the brakes). In yet another aspect, monitoring remains continuous, irrespective of whether a vehicle currently is within a platoon pair. Monitoring enables tracking of vehicles, and also can enable the provision of safety alerts related to one or more of traffic, weather, and road conditions.

While the benefits of platooning make it desirable to link vehicles whenever possible, not all sections of a roadway are appropriate for platooning. Thus, for long range coordination of vehicle for purposes of linking, such as shown in FIG. 14A where vehicles 1410 and 1420 may be potential platoon partners, an analysis of the roadway is required before such platooning can be authorized. For this purpose, as shown in FIG. 14B, some sections of a roadway may be designated in the NOC's database as inappropriate for linking. Such geo-fencing can exist for numerous reasons, such as road construction, traffic, traffic control, and so on.

The process of operating vehicles as a platoon, i.e., semi-automatically (or, in some aspects, automatically/autonomously) within a relatively close distance to one another, comprises several phases, as discussed generally above. While aspects of the present invention involve two-vehicle platoons, it will be understood by those skilled in the art that the present invention is not limited to such platoons, but instead can be any number of vehicles operating cooperatively in accordance with the processes and systems described herein. More specifically, the initiation of the platoon involves pull-in, or bringing the vehicles, operating at speed, into close proximity to one another until they are separated by a target gap distance. Once pull-in is completed, their joint movement as a platoon is maintained during normal operation, which can involve either maintaining the same gap distance or adjusting the gap distance for specific operating conditions. In addition, normal operation is also subject to various alerts, some of which may cause the platoon to be dissolved. Dissolution of the platoon involves increasing the gap distance sufficiently to permit independent operation of the vehicles, including ending semi-automatic operation and, in at least some instances, having the driver take over operation of the vehicle. In other aspects, fully automatic operation is permitted and no driver take-over is required.

FIG. 15A describes aspects of the platooning process. The system starts at 15000, and at 15050 advances through selection of a platooning partner in the manner discussed previously. At 15100, the vehicles prepare to platoon, beginning with a check to ensure that all platooning conditions are met, shown at 15150. If all conditions are not met, the process loops back to 15100. However, if they are met, the process advances to 15200 with an indication of readiness to platoon. If the drivers initiate platooning by taking an action such as pressing a button at 15250, then at 15300 the process begins the pull-in process. If the drivers do not indicate readiness to platoon, the process loops back to 15150. In some aspects, for example for autonomous vehicles, no driver exists and the process can proceed automatically.

At 15300, the pull in process involves closing the gap between the platooning vehicles, until they reach the target gap for normal platooning operation. Pull-in is discussed in greater detail herein. In one aspect, the target gap is typically about 30 feet for long haul trucks, but can range from less than 20 feet to more than 50 feet for such large vehicles, and can vary significantly from that range for other types of platooning vehicles (see FIG. 1C, for example). Calculation of safe gap distance preferably takes into account vehicle speed and braking capability, and can also take into account weather, road conditions, and other factors external to the vehicle. Once pull-in begins at 15300, a check is made at 15350 to determine whether the vehicles have closed to the target platooning gap. If yes, then at 15400 the platoon is maintained at that distance. If not, a check is made at 15500 to determine whether there is a request to dissolve the platoon.

If no request to dissolve the platoon has occurred, the process loops to 15300 and the pull-in process continues. The tests performed at 15350 occur frequently, as part of the realtime control loop of the system, typically significantly faster than once per second, for example, ten times per second or more frequently, and so the loop of 15300-15350-15500 will typically occur many times before the vehicles move close enough that they are at target gap distance. It will be appreciated by those of ordinary skill in the art that, for some aspects, operation of the active cruise control (ACC) and collision mitigation systems (CMS) of some vehicles will be modified in accordance with aspects of the present disclosure to permit the platooning vehicles to close to the desired gap distance.

Requests to dissolve the platoon can also be identified through a check at 15450, also performed regularly, again typically significantly faster than once per second as noted above. If a request to dissolve is received from either 15450 or 15500, those requests are multiplexed at 15550 and a dissolve platoon process is initiated at 15600. The dissolve platoon process essentially involves gradually increasing the gap by decreasing the speed of the rear vehicle relative to the front vehicle. Once a suitable distance is achieved, where the braking and other safety benefits of the present system are no longer needed, driver take-over is enabled as checked at 15650. If the gap is not yet sufficient for driver take-over, the dissolve process loops back to 15600. If the gap is sufficient (i.e. 15650 yields a yes), the dissolve process continues at 15700 by signaling to the driver that s/he is to take over operation of the vehicle. Of course, in the event of an emergency, the driver can terminate the platoon immediately either by stepping on the brake or simply turning off the platoon authorization, either of which generates a dissolve request as checked at steps 15450 and 15500.

Following driver takeover at 15700, a check is made at 15750 to determine whether the dissolve process is complete. Dissolution completion can occur in different scenarios. In some instances, a platoon is dissolved because road conditions, traffic, a cut-in by another vehicle, or other events, makes platooning inappropriate for a short period of time, but the routing and partner selection still are acceptable for platooning once the unacceptable condition is resolved. The dissolve process can also end following take-over by the drivers, for example because of an emergency. Thus, if the check at 15750 yields a yes, the process can loop through multiplexer 15850 back to 15100 to see if further platooning is acceptable. If 15750 yields a "no", the process advances to 15800 to determine whether the driver has successfully taken over. A "no" loops to 15700 while a yes is multiplexed at 15850 with a yes from 15750, and loops back to 15100. It will be appreciated that operation of the ACC and CMS of the vehicle may operate normally when the platoon is dissolved.

Figure 15B:
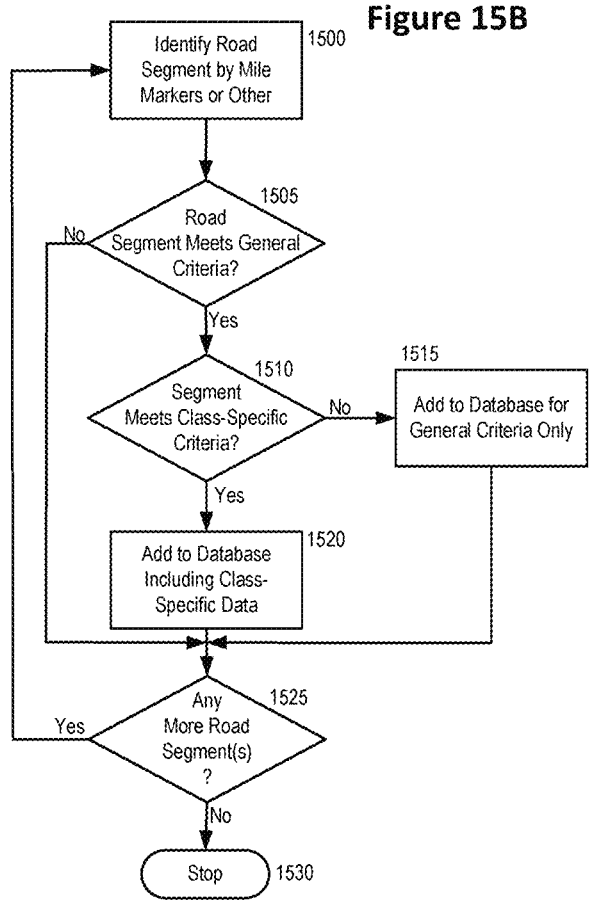
FIG. 15B illustrates in flow chart form an aspect of the disclosure by which platoonable road segments are identified.

FIG. 15B illustrates one aspect for a process for identifying platoonable road segments. The process initiates at 1500 by breaking a roadway into segments based on any suitable criteria. One example of a suitable criteria is to use mile markers, although latitude/longitude data and numerous other criteria can also be used. Then, at 1505, each segment is evaluated to determine if it meets one or more basic criteria for platooning. The basic criteria can include speed limit, known construction, known traffic choke points, excessive up- or down-grades, weather or other environmental problems, and the like. External criteria such as government regulation and fleet business practices also may form part of the basis for platooning.

If the segment under examination meets the general criteria, the process advances to 1510, where the road segment can be evaluated in accordance with class-specific criteria. Not all aspects will use class-specific criteria. However, some fleets or other traffic management systems may manage vehicles of various classes or types. In such instances, platooning is possible within a specific class, and the criteria appropriate for a platoon within a specific class may vary dramatically from the general criteria.

In some such instances, the class-specific criteria may be less limiting than the general criteria noted above. For example, while the general criteria may be applicable for large commercial trucks, the class "18 wheelers", a fleet may also include smaller box vans or similar vehicles that can handle grades or other roadway conditions that the larger vehicles cannot handle. In such instances, it may be desirable to reverse the order of steps 1505 and 1510, and accordingly it will be appreciated that the order shown in FIG. 15B is not intended to be limiting.

If the road segment does not meet the class specific criteria, then at 1515 the segment is added to the database for the general criteria only. However, at 1520 segments that meet both the general criteria and the class-specific criteria are added to the database including class-specific data.

The process then advances to 1525, to determine if there are other road segments to be analyzed. If there are, the process loops back to 1500 for the next segment. If not, the process terminates at 1530.

The results generated by the process of FIG. 15B permit the comparison of a travel forecast with the database of platoonable roadway segments. In some aspects, the sections of platoonable roadway will be incorporated into the travel forecast developed by the process of FIG. 12. In other aspects, the travel forecast includes only the routing, and the congruence of the routing with the database of platoonable roadway segments is determined by the appropriate processor at a later step.

Identifying a potential platooning partner requires not only that the vehicles travel the same route, but also that they travel the same route at relatively close to the same time. For example, if Vehicle A is an hour ahead of Vehicle B, and has no plans to stop, the loss of time by Vehicle A that would be required for Vehicle A to platoon with Vehicle B is so large that the cost of a platoon by those vehicles probably outweighs the benefits to be gained. However, if, for example, Vehicle A is only a minute ahead of Vehicle B, then the gain from platooning likely outweighs the time lost by Vehicle A even if it is the only vehicle that adjusts speed to accommodate a linking. In many instances where platooning is viable, rendezvous guidance, as mentioned at 1360 in FIG. 13, will suggest actions by both vehicles. However, many commercial vehicles, including many fleet-operated long-haul trucks, have governors which control maximum speed of the vehicle. In some vehicles the governor setting is accessible through the CAN bus, as was discussed with reference to FIG. 7B, and may be adjustable from the NOC. In cases where Vehicle B can increase speed safely and legally, the rendezvous guidance may suggest speed adjustments for both vehicles. In instances where Vehicle B is unable to increase speed, Vehicle A is typically guided to reduce speed to permit linking.

Figure 15C:
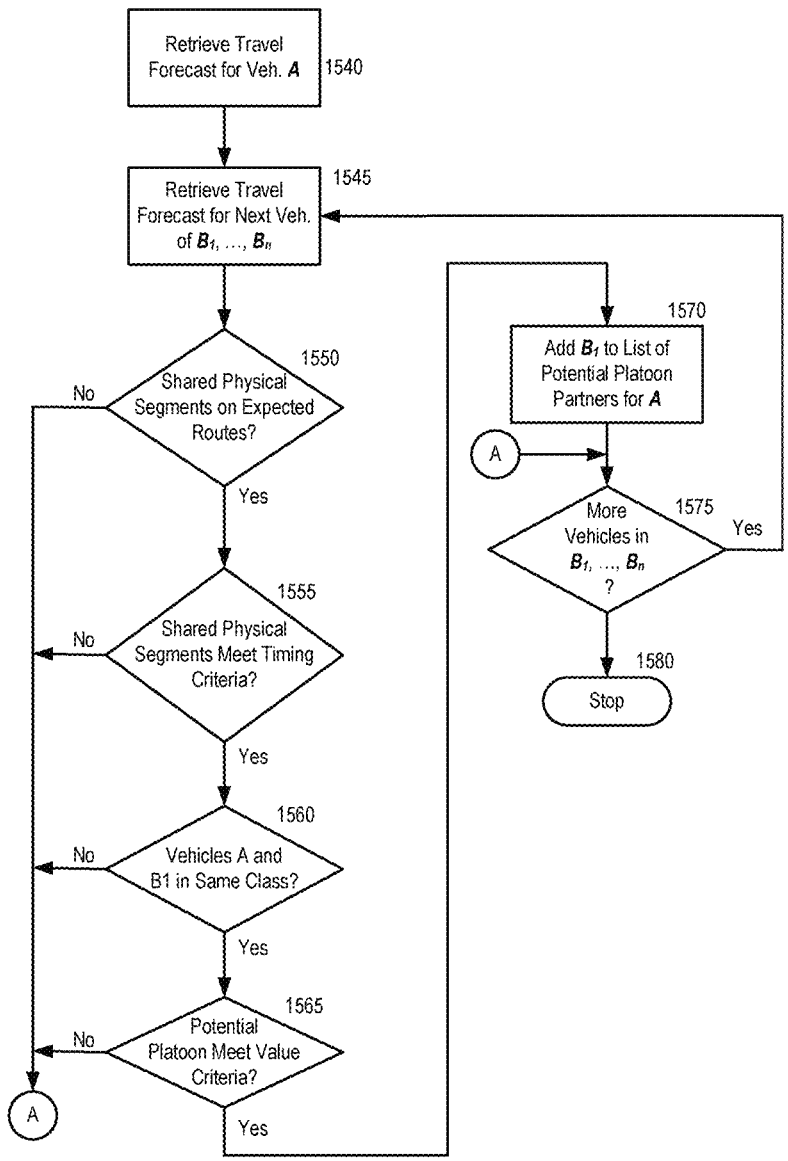
FIG. 15C illustrates in flow diagram form a process for identifying potential platoon partners.

FIG. 15C describes flow for an analysis of the time and routing for Vehicles A and B1 as potential platoon partners, according to one aspect. At 1540, the travel forecast for vehicle A is retrieved and at 1545 the travel forecast for the first potential partner, B1, is retrieved. At 1550, the forecasts are compared for common road segments. If there are sufficient common road segments, at 1555 a check of the timing criteria is made. If that, too, indicates a potential platooning partner, then, for some aspects where only a single class of vehicle is involved such as long-haul trucks, Vehicle B1 will be added to the list of potential partners for Vehicle A. In some alternative aspects where different classes of vehicles are managed by the system, a further check is made at 1560 to determine whether the vehicles are in the same class. It will be appreciated that the step of checking the class could be done in any order. Further, in some aspects an assessment of the cost-benefit of a platoon of Vehicle A and Vehicle B1 is made in accordance with predetermined criteria, as shown at 1565. Potential partners that meet each of the applied tests are then added to the list of potential partners at 1570 and then advances to 1575.

If the potential pairing fails to meet the acceptable criteria of any of 1550 through 1565, to the extent those steps apply (as just indicated, some of them may not apply in some aspects), the process of FIG. 15B advances to 1575 where the system checks to determine if other potential partners remain to be evaluated. If so, the process loops to 1545 for the next potential partner. If there are no more potential partners, the process terminates at 1580.

Referring next to FIGS. 16A-16E, a visual representation of highway segments is provided to assist in understanding the identification of platoonable roadway segments and the development of a platoonable routing for a pair of vehicles. FIG. 16A shows a section of roadway 1600 broken into segments, in this instance as determined by various mile markers such as 137.1, 196.4, 233.1, and 255.6. In FIG. 16B, smaller roadway segments that are known to be unsuitable for platooning, such as a downhill grade indicated at 1605 and a construction zone indicated at 1610, are overlaid on that road segment 1600. Thus, the segment of roadway 1600 is platoonable except for the sections 1605 and 1610.

Next, the travel forecast for Vehicle A is applied to segment 1600. As shown in FIG. 16C, Vehicle A will travel on the road segment from mile marker 137.1 to mile marker 274.4, indicated at 1615. Similarly, Vehicle as travel forecast shows that it will travel on the road segment from marker 123.6 to 255.8, shown in FIG. 16D and indicated at 1620. By overlaying the travel forecasts of Vehicles A and B with the segment identified as platoonable, it can be seen that the platoonable routing 1625 for Vehicles A and B is from marker 137.1 to marker 255.8, except for the downgrade and construction zone indicated at 1605 and 1610, as shown in FIG. 16E.

Selections of vehicles for platooning can be represented mathematically. For example, for the roadway segment of FIGS. 16A-16E, the following describes the result shown in FIG. 16E, given the mile post value sets representing of travel of each vehicle on the illustrated roadway segment:
 a. A=[137.1, 274.4]
 b. B=[123.6, 255.8]
 c. Compute the shared travel section of Hwy 23:
 d. A ∩ B=[137.1, 255.8]
Given a mile post value set for the platoon-able section(s) of the illustrated roadway:
 a. P=[0, 148.7] ∪ [151.3, 231.4] ∪ [234.5, 354.2]
 b. Compute the platoonable shared travel section(s) of Hwy 23:
 c. A ∩ B ∩ P=[137.1, 148.7] ∪ [151.3, 231.4] ∪ [234.5, 255.8]
 d. If A ∩ B is empty, then the two vehicles do not share a route
 e. If A ∩ B ∩ P is empty, then any shared route is not platoonable.
 f. The total length of A ∩ B ∩ P represents the maximum payoff of forming the platoon, i.e., the number of platoonable miles of the shared route.

The set representation also forms the basis for creating a searchable database of current platoon opportunities, where, in one aspect, each record in the database contains at least:
 a. Highway designation, e.g. "N I-35W" (direction, system, number, optional descriptor)
 b. Start and end mile post values
 c. Minimum start and maximum end expected time stamps (a coarse feasibility filter)
 d. Vehicle identifier, expiration time, . . .

In determining whether to form a platoon, it is also valuable for either the drivers, the fleet operator, or other system operator to assess the cost benefit of forming a platoon. Thus, with reference to FIG. 17A, some characteristics for evaluating the cost-benefit of a platoon can be understood. As noted above, a first characteristic is the destination arrival time sacrificed by the lead vehicle. Another characteristic is the ability of each vehicle to operate at the required speeds for the required periods of time to form the platoon, and then the endurance to maintain the platoon once it has formed. Evaluation of these characteristics results in an assessment of the remaining platooning potential, and in one aspect can be expressed as a distance relative to the platoonable segment(s).

In some respects, the decision to platoon can be regarded as a "contract" between the drivers (and authorized by the NOC in many aspects). That contract essentially commits each vehicle to maintain particular speeds for particular times, both to achieve linking and to maintain the platoon. This commitment can be appreciated from FIG. 17B, where the rendezvous guidance suggests to each driver what speeds to maintain to achieve linking at a particular distance and time. However, that contract can be voided when circumstances change for either vehicle, so that a revised rendezvous estimate exceeds either a distance threshold or a time limit.

In addition, maximizing the benefits of platooning for a fleet of vehicles may mean selecting a platooning partner that is not optimal for a specific pair of vehicles. For example, for four vehicles in a fleet, designated A, B, C and D, there are three possible pairings. This can be represented mathematically as $$A\text{-}B/C\text{-}D,\ A\text{-}C/B\text{-}D,\ \text{and}\ A\text{-}D/B\text{-}C$$

Where fen( ) represents a general benefit function, pairing combinations can be expressed as:

$$fen(A \cap B \cap P) > fen(A \cap C \cap P)\ \text{and}\ fen(A \cap B \cap P) > fen(B \cap D \cap P)$$

$$fen(A \cap B \cap P) + fen(C \cap D \cap P) < fen(A \cap C \cap P) + fen(B \cap D \cap P)$$

The combinations in the previous two paragraphs are merely exemplary. Other combinations are possible, based on the particular pairings. The larger the number of vehicles from which platooning partners may be selected, the larger the number of combinations, as well as, potentially, the number of instances in which a pair of vehicles selected for platooning may not represent an optimal pairing.

In addition, it can be seen that, for at least some definitions of fen( ), the pairing combination that yields the maximum benefit for a specific vehicle or pair of vehicles is not the same as the pairings that yields the maximum combined benefit for all vehicles. Thus, in some aspects, selection of pairings may be performed at the NOC level rather than by individual vehicles. Such pairings can readily include one or more of the factors discussed above in connection with FIG. 11B, including distance, time, hours of service, etc.

Figure 18:
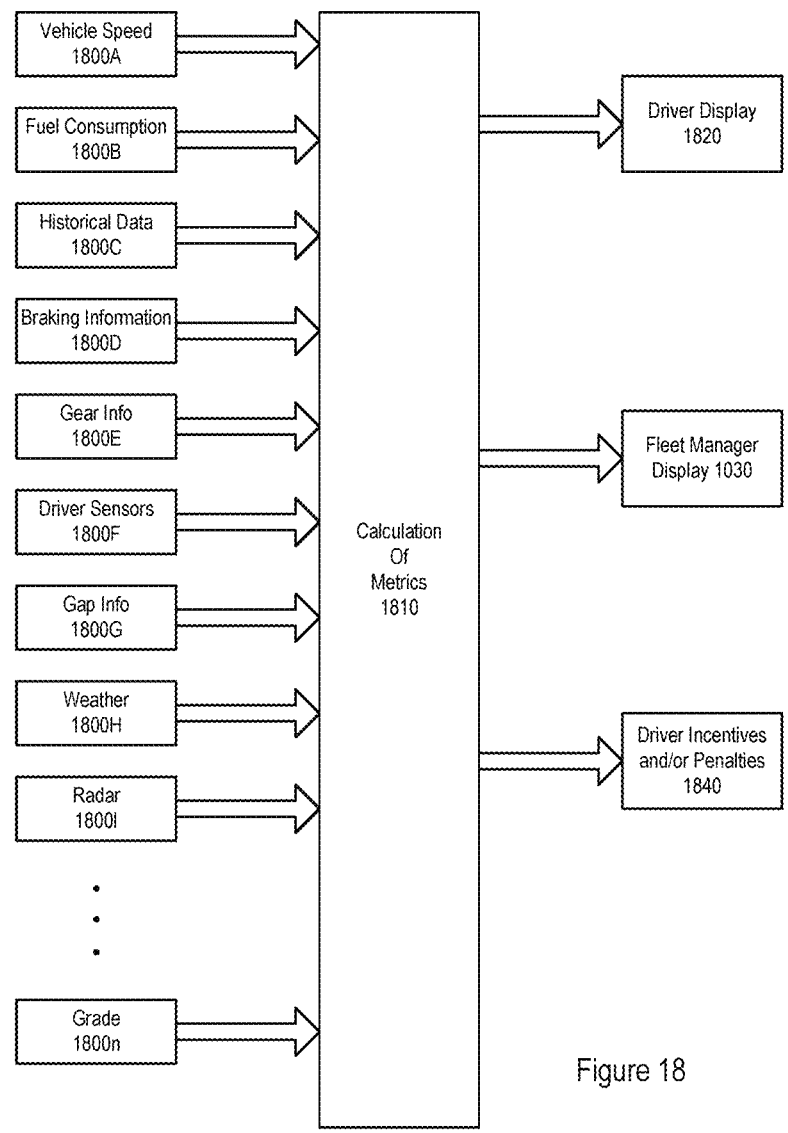
FIG. 18 illustrates in block diagram form a processor-based system for capturing and calculating metrics associated with platooning.

Referring next to FIG. 18, one aspect for collecting data about the operation of a particular vehicle, and a fleet as a whole, can be better appreciated. A variety of measured data 1800A-n, including vehicle speed 1800A, fuel consumption 1800B, historical data 1800C, braking information 1800D, gear information 1800E, driver sensors 1800F, gap information 1800G, weather 1800H, radar information 1800I, and grade 1800*n* as just some examples, are provided to the central server or the on-board system 1810. The server or other processor 1810 calculates a selection of metrics including miles per gallon, driver efficiency, savings, platooning duration, platooning availability, and numerous variations. From these, selected metrics can be displayed to the driver on display 1820, or to the fleet manager on display 1830, or can be used to provide driver incentives, as indicated at 1840. Various data may be displayed to the driver via the HMI interface, such as, for example, savings per mile achieved by the driver.

Figure 19B:
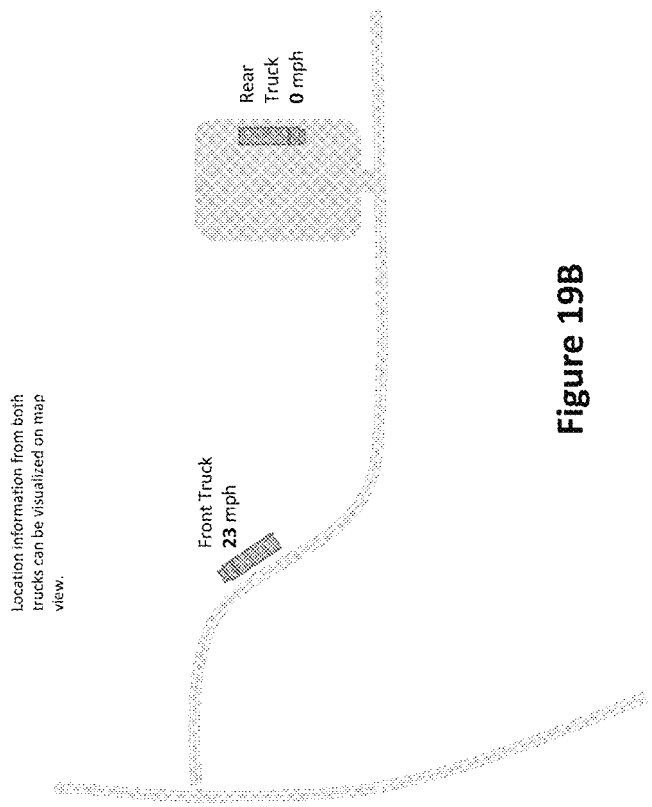
FIG. 19B illustrates in map form the relative physical locations of the departing vehicles being coordinated by the process of FIG. 19A.

Referring next to FIGS. 19A-19B, an additional aspect of the present invention can be better understood. Sometimes it is desirable for vehicles to be organized into platoons from when one or both vehicles are stationary, such as at their point of origin, a rest stop, or other similar circumstances. For example, some long haul trucks are organized into platoons at their fleet location, while in other cases both or multiple vehicles will proceed concurrently such as after a meal or other break.

It is not always possible to make platooning determinations with stationary vehicles. For example, vehicles can change weight during a stop (because of adding/dropping a trailer, changing a full trailer for an empty one or vice versa, trailer loading/unloading). In one aspect, because change in vehicle weight during a stop may not be known, a previously-calculated weight may be reset to be an unknown value if the vehicle is stopped for more than a given amount of time (for example, a time sufficient for one of the just-mentioned circumstances to occur). Weight may not be determined again until, for example, a vehicle's acceleration is monitored, and the resulting data used to re-determine vehicle weight. In such circumstances, a decision to form a platoon may be made before vehicle ordering is ascertained (with the heavier vehicle leading and the lighter vehicle following). In addition, it is possible that a vehicle, once its weight is re-determined, will be overweight and therefore not suitable for platooning. In some circumstances, vehicle weight cannot be re-determined. When that happens, a decision to platoon may be reversed for safety reasons.

Where platooning is determined while vehicles are stationary, it is desirable to coordinate vehicle departures. FIG. 19B shows the relative locations of two vehicles leaving a yard. The first vehicle is already moving, albeit fairly slowly (e.g. 23 mph), while the second vehicle is not yet moving. In such an instance, platooning is facilitated by prompt sharing of information until both vehicles have reached the ready-to-platoon state. That typically requires that the platooning system on both vehicles is initialized and operational, that both vehicles are either moving or ready to move, and that the vehicles are at acceptable relative locations. Such coordination can be achieved by the process shown in FIG. 19A, in which the upper block illustrates the process steps taken by the first vehicle, and the lower block illustrates the process steps taken by the second vehicle. The two vehicles can share information as they move into position and are ready to platoon. Communication between the vehicles occurs via DSRC, LTE, WiFi, or other suitable protocol such as a modulated light source/receiver pair.

To get ready for platooning, each vehicle starts its system. Motion of each vehicle relative to the other (relative velocity), and position or location of each vehicle relative to the other, can be used either in conjunction with on-board processors at each vehicle, or at the NOC, or a combination of both, to get the two vehicles ready to platoon.

Figure 20:
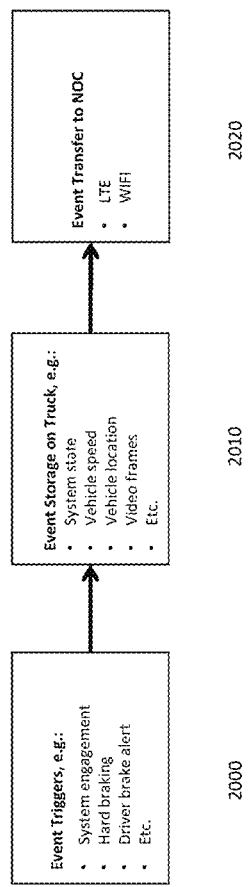
FIG. 20 illustrates a general process flow for event data logging and data transfer.

Referring next to FIG. 20, one aspect of a data logging process in accordance with an aspect of the present disclosure can be better appreciated. At 2000, event triggers, including such items as system engagement (indicating an attempt to start platooning); hard braking (indicating a change in movement such that platooning, if currently in place, should be discontinued); driver brake alert (a drive action indicating that platooning, if currently in place, should be discontinued); and other similar triggers, may be logged. These and other triggers have been discussed earlier with reference to sensors shown in FIGS. 7A, 7B, 8A, and 8B. At 2010, information on various events at a vehicle may be stored, including a state of a platooning system on the vehicle; vehicle speed; vehicle location; video information showing vehicle movement, location, and surroundings; and other similar data. At 2020, information from 2000 and 2010 may be transferred to the NOC by suitable communications protocols, including wireless networking, cellular networking, or other protocols which are operable for communication between the vehicle system and the NOC.

Figure 21:
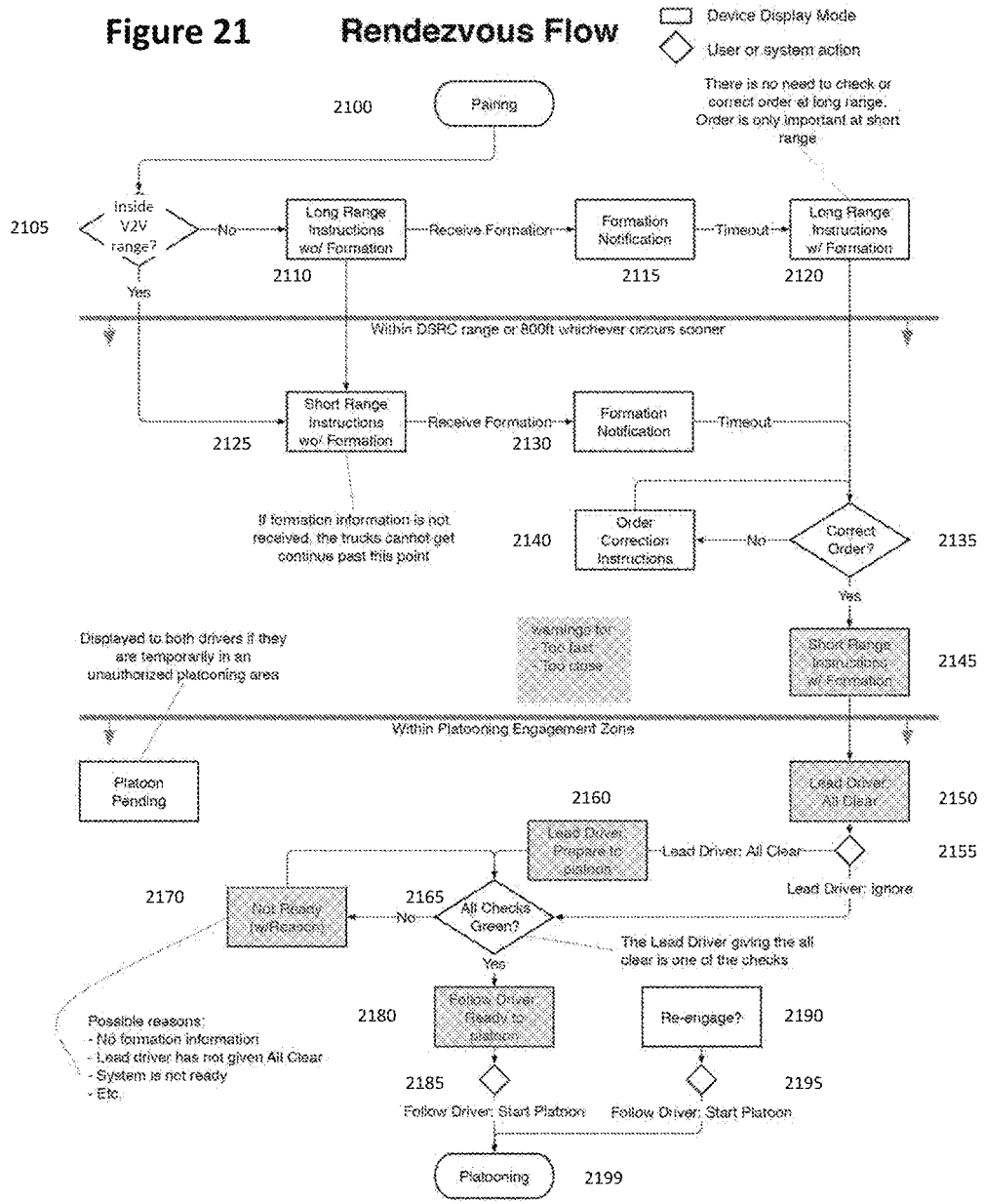
FIG. 21 illustrates one aspect of a user interface process flow for a rendezvous.

FIG. 21 illustrates a flow diagram, from the UX/UI perspective, showing steps in achieving a rendezvous. In the Figure, diamond shapes denote steps involving user or system action, while rectangles denote alerts and status displays.

Flow for the pairing process, leading to a rendezvous between vehicles initiating a platoon, begins at 2100. At 2105, a check is made to see whether the potentially rendezvousing vehicles are within communications range (e.g. within DSRC range). If they are not, then at 2110 vehicles implement one type of instructions based on their not being in communications range, e.g. instructions for seeking platooning without actually engaging in platooning. If a platooning formation is possible, then at 2115 the vehicles are notified of formation possibilities, and at 2120, receive instructions for getting into range to platoon. Such instructions will come from the NOC. For purposes of getting into range in order to form a platoon, ordering of the vehicles as lead vehicle or following vehicle are not important.

If the vehicles are within communications range at 2105, then at 2125 the vehicles implement instructions for seeking platooning without actually engaging in platooning. Flow also can go from 2110 to 2125 once vehicles are capable of communicating via short range communications protocols. Now that the vehicles are closer range, at 2130 there is a notification of platoon formation. Also, now that the vehicles are in closer range, ordering of the vehicles in the platoon matters, taking into account items such as relative locations, physical attributes of the vehicles such as braking capability, other attributes such as vehicle class and other attributes discussed earlier, and the like. A determination of ordering occurs at 2135. Any necessary ordering correction occurs at 2140, so that the lead vehicle and the following vehicle are in the proper order.

Once ordering is complete, at 2145 a further set of instructions for formation, specific to vehicles being in closer range, happens. Then, at 2150, the driver of the lead vehicle receives an indication that platooning is possible with the following vehicle. At 2155, the driver of the lead vehicle can decide to platoon, followed by preparation to platoon at 2160. Alternatively, the lead vehicle drive can ignore the platooning opportunity. At 2165, irrespective of the driver's decision, a check is made to see whether all of the conditions to begin platooning are satisfied. Such checks can include checks from the NOC, such as the authorization, checks on driver inputs such as pushing the platooning button, and also checks on system and truck status. If the checks come out satisfactorily (referred to as "green" in FIG. 21), the vehicles are ready for platooning. If the checks do not come out satisfactorily, the vehicles are not ready for platooning, for any of a variety of reasons, including a lack of formation information, a lack of an "all clear" from the driver of the lead vehicle, the system not being ready, or the like.

If all checks are green, then 2180 the following driver provides an indication of readiness to platoon, and at 2185, the following driver starts the platoon. To start the platoon, the driver may push a button. In one aspect, platooning may be started automatically. Platooning is accomplished at 2199.

In some circumstances, whether because of weather, traffic, intervening vehicles, or other reasons discussed above, a platoon may be interrupted, even though the lead and following vehicles may be in range. When the intervening circumstances have abated, and the lead and following vehicles are ready to re-establish platooning, then at 2190, a suggestion to re-engage can be provided to both vehicles. Again, at 2195, the following drive can start the platoon, and platooning is accomplished at 2199.

Figure 22:
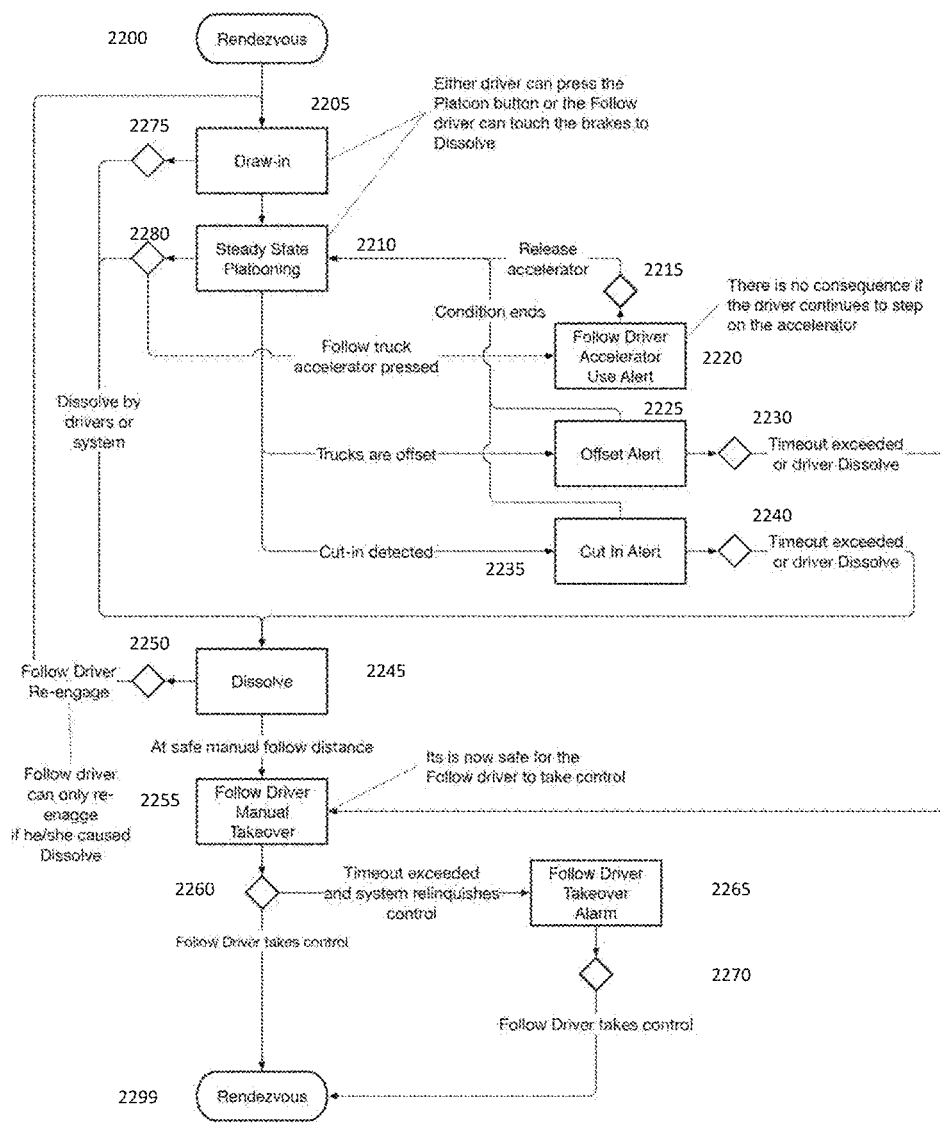
FIG. 22 illustrates one aspect of a user interface process flow for platooning following rendezvous.

FIG. 22 illustrates in flow diagram form the UX/UI stages for steady state platooning through various alerts, then dissolving the platoon and manual takeover by the driver of the following vehicle.

Rendezvous begins at 2200, and the draw-in or pull-in process starts at 2205. 2210 signifies a steady platooning state. At 2205 or 2210, either driver can initiate or end platooning by pressing a Platoon button, or the following driver can hit the brakes to dissolve the platoon. Dissolving the platoon can result from other conditions as well, as discussed earlier. At 2225, there may be an alert that the lead and following vehicles are offset by some amount. At 2230, after either the condition persists for more than a predetermined period of time (leading to a timeout), or a driver decides to dissolve the platoon, at 2255 the following driver can effect manual takeover of the following vehicle.

At 2235, there may be an alert that another vehicle has cut in between the lead and following vehicles. At 2240, after either that condition persists for more than a predetermined period of time (leading to a timeout), or a driver decides to dissolve the platoon, at 2245 the platoon is dissolved. Alternatively, the cut in condition may end, and steady state platooning may be re-established at 2210. As a further alternative, the following driver may release the accelerator at 2215, and at 2220 an alert may be issued to one or both the lead and following vehicles, signifying the following driver's accelerator use.

In another aspect, after steady-state platooning has been reached at 2210, the following driver may press the accelerator at 2280, leading to either platoon dissolution, or back to 2220 to provide the accelerator use alert.

In yet another aspect, after the initiation of rendezvous at 2200, the drivers of one or both of the lead and following vehicles may decide not to platoon. Subsequently, the following driver may decide to re-initiate the rendezvous. In one aspect, the following driver may effect the re-initiation only if the following driver had made the decision not to platoon in the first place.

Other conditions also may be signified. For example, after dissolution at 2245, at 2250 the following driver can decide to re-engage the platoon. In one aspect, following driver re-engagement is possible only if the following driver decided to dissolve the platoon in the first instance. At 2260, a decision point exists for the system as to whether to re-establish the platoon, or relinquish control. If the following driver decides to take control, then the rendezvous stage may be re-entered at 2299. If at 2260 a timeout occurs, indicating passage of more than a predetermined period of time, at 2265 the following driver may be given an indication that that driver can take over control of the vehicle. At 2270, the following driver can take control of the following vehicle, and again the rendezvous stage may be re-entered at 2299.

In sum, aspects of the present disclosure provide devices, systems and methods for vehicle monitoring and platooning, including in some aspects various capabilities for semi-automated vehicular convoying. Advantages of such a system include the ability for a trailing vehicle to follow a lead vehicle closely in a safe, efficient, convenient manner, providing improved fuel economy and more efficient fleet management.

Figure 23:
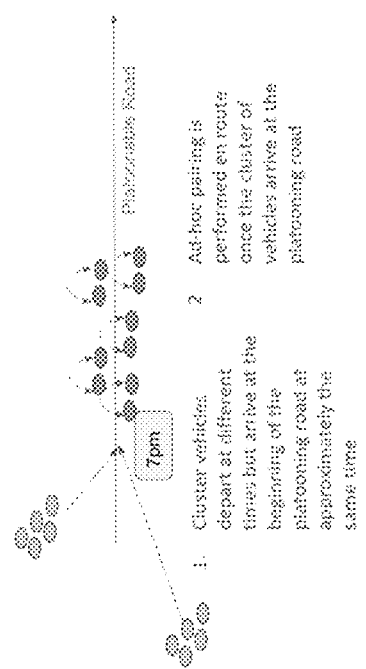
FIG. 23 illustrates platooning involving pairing of vehicles selected from clusters.

In accordance with another aspect of the present disclosure, vehicles may be paired in clusters. Whether the vehicles are in the same fleet, or in different fleets, cluster pairing can require groups of vehicles in the same or different fleets to adjust their departure time and/or routes so that the pairing can be performed at the beginning of the platooning route or opportunity. Drivers will have access to the time and approximate location of where the clusters will meet up. If the driver misses one cluster, in accordance with one aspect, the system can provide a subsequent cluster meet up schedule. Once the cluster vehicles arrive on a platoonable road, the system performs ad-hoc pairing, as shown in FIG. 23, using information, processing, and communications protocols as described earlier in this disclosure.

When clusters are moving at different speeds on the platoonable road, vehicles re-entering a platooning road from rest stops also can access information about cluster status so that a vehicle at rest may find the best available partner en route with which to platoon. Fleets entering the platoonable road at a different on-ramp also may join a moving cluster.

In one aspect, using standard turn-by-turn navigation application is not sufficient to get the drivers to a platooning rendezvous point within a roadway segment successfully. Standard navigation application takes one vehicle to one destination. In one aspect, the system accounts for multiple platoonable vehicles' positions, multiple destinations, and platooning attributes across multiple fleets to prescribe turn-by-turn navigation instructions to multiple drivers heading towards a platoonable road or to a static or dynamic destination (such as another vehicle). The system recommends speed and route changes in the turn-by-turn direction to maximize the possibility of two or more drivers meeting within a particular roadway segment where a rendezvous can occur, and/or within a window of time during which platooning can occur. In one aspect, the turn-by-turn direction for each driver includes direction necessary to get the driver to a cluster and displays the cluster information to the driver. In one aspect, if the drivers are paired, the turn-by-turn direction includes partner's breadcrumbs and estimated time of arrival to rendezvous. The turn by turn directions will display the location of the cluster or the partner vehicle until they are in range.

In some aspects, where there is a continuous and/or substantial road segment length during which vehicles may platoon, turn-by-turn direction may not be sufficiently helpful, because the location where a platoon may form within that substantial length may vary.

Once in range to platoon, the system then can either completely automate the process to form the platoon, or provide step-by-step guidance to instruct the drivers towards platoon formation. Navigation to and from other vehicles may include, but need not be limited to:
  a. One vehicle to a dynamic destination
  b. Multiple vehicles to a dynamic destination
  c. One moving vehicle to a static destination
  d. Multiple vehicles to a static destination
  e. One or multiple vehicles to cluster segments This disclosure contains numerous references to a NOC, to various ECUs, and to one or more processors. According to various aspects, each of these items may include various kinds of memory, including non-volatile memory, to store one or more programs containing instructions for performing various aspects disclosed herein.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

APPENDIX sample listing of authorization file

```
{
  "version":1001001,
  "created":1518633354,    // --- these timestamps (epoc seconds) describe the time
validity window of this authorization message
  "effective":1518633354,
  "refresh":1518633366,
  "expires":1518633654,
  "partner": {    // --- the partner record describes the identity of the partner vehicle,
and how to communicate with it, both with data and voice.
      "fleet":"1",
      "vehicle":"kilo3",
      "mac_address":"99:99:99:99:99:99",
      "rt_channel":180,
      "rt_offset":7500000,
      "nrt_address":"99:99:99:99:99:99",
      "nrt_channel":176,
      "push_to_talk_session_id":9999999999,
      "push_to_talk_server_ip_address":"99.99.99.99"
  },
  "relative_position": {  // -- the relative position record content helps the UX describe to
the driver how to find the partner truck, when separated.
      "separation":-79.66236,
      "partner_speed":20.5433102,
      "partner_milepost":0.4424,
      "self_milepost":0.3929,
      "platoonable":true,
      "milepost_of_end":1.125,
      "miles_to_end":0.7321
  },
  "identity": {    // --- the identity record describes the name of the highway to which
the authorization applies
      "number":"CA-300",    // --- this "highway" described here is actually a test
track.
      "direction":"N",
      "state":"CA"
  },
```

APPENDIX-continued sample listing of authorization file

```
    "segments":{    // --- the segments of highway which are or are not authorized for
platooning
    "authorized_front":true,    // --- front/back describe where the truck may be relative
to its partner
        "authorized_back":true,
        "segment": [
            {        // --- this segment of "highway" is authorized for platooning at 12
meters
                "start_mile_post":0.2929, // --- segments are demarked with milepost values
                "end_mile_post":1.125,
                "minimum_gap":12,
                "authorized_continue":true,
                "authorized_start":true
            },{        // --- this segment of "highway" is not authorized for platooning
                "start_mile_post":1.125,
                "end_mile_post":1.5,
                "minimum_gap":9.2,
                "authorized_continue":false,
                "authorized_start":false
            }
        ]
    },
    "pathways": {    // --- the pathways section describes the physical location and
shape of the highway
        "pathway": [
            {      // --- this is the first pathway
                "left_fence":-0.0001,    // --- the fence fields describe the width - in degrees of arc
                "right_fence":0.0001,
                "step": [    // --- the step array decribes the shape and milepost distribution
                    {
                        "latitude":37.4066198,
                        "longitude":-121.1072545,
                        "cosine_latitude":0.7944,
                        "magnitude":0,
                        "bearing":0,
                        "mile_post":0.2929
                    },{
                        "latitude":0.0103902,
                        "longitude":-0.0104653,
                        "cosine_latitude":0.7942;
                        "magnitude":0.01331,
                        "bearing":321,
                        "mile_post":0.9271
                    }
                ]
            },{      // --- this is a second pathway that follows the first
                "left_fence":-0.0001,
                "right_fence":0.0001,
                "step": [
                    {
                        "latitude":37.41701,
                        "longitude":-121.1177199,
                        "cosine_latitude":0.7942,
                        "magnitude":0,
                        "bearing":0,
                        "mile_post":1.22
                    },{
                        "latitude":0.00015,
                        "longitude":-0.0002599,
                        "cosine_latitude":0.7942,
                        "magnitude":0.00025,
                        "bearing":306,
                        "mile_post":0.017
                    },{
                        "latitude":0.00018,
                        "longitude":-0, 0007899,
                        "cosine_latitude":0.7942,
                        "magnitude":0.00065,
                        "bearing":286,
                        "mile_post":0.045
                    }
                ]
            }
        ]
    }
}
```

What is claimed is:

1. A method of remotely authorizing vehicle automation for one or more vehicles out of a plurality of vehicles, the vehicle automation including autonomous operation of the one or more vehicles, the method comprising:
   analyzing, at a network operations center (NOC), external conditions in a vicinity of one or more of the plurality of vehicles, the external conditions being selected from the group consisting of location, time of day, road conditions, weather, and traffic; and
   responsive to the analyzing of the external conditions, authorizing, at the NOC, the autonomous operation of at least one of the plurality of vehicles;
   the authorizing enabling the at least one vehicle to engage in autonomous operation which enables forming a platoon between at least two of the plurality of vehicles, the platoon including a lead vehicle and one or more following vehicles,
   the autonomous operation comprising specifying which of the plurality of vehicles are authorized to form the platoon and which of those vehicles will be the lead vehicle and which will be the one or more following vehicles.

2. The method of claim 1, further comprising:
   analyzing, at the NOC, internal conditions relating to the one or more of the plurality of vehicles, the internal conditions being selected from the group consisting of vehicle characteristics, vehicle position, vehicle route, vehicle destination, heading, and platooning availability; and
   wherein the authorizing, at the NOC, is responsive to the analyzing of the external and internal conditions.

3. The method of claim 1, wherein the authorizing further comprises transmitting one or more data packets containing information to:
   specify a gap between the lead and the one or more following vehicles.

4. The method of claim 3, wherein the authorizing comprises transmitting one or more further data packets containing information to change one or more of the first location, the second location, or the gap.

5. The method of claim 1, wherein the road conditions comprise one or more items selected from the group consisting of road type, road geometry, road grade, road width, road conditions, road regulatory information, topography, absolute position, altitude, and altitude changes.

6. The method of claim 2, wherein vehicle characteristics comprise one or more items selected from the group consisting of vehicle weight, vehicle dimensions, vehicle type, and vehicle condition.

7. The method of claim 6, wherein vehicle condition comprises one or more items selected from the group consisting of vehicle age, mileage, brake condition, transmission condition, engine temperature, odometer reading, load information, and driver status.

8. The method of claim 7, wherein load information comprises one or more items selected from the group consisting of customer, load type, time when the load was placed in the vehicle, and length of time that the load has been on the vehicle.

9. The method of claim 7, wherein driver status comprises one or more items selected from the group consisting of driver age, length of time the driver has been behind the wheel of the vehicle, and time remaining for the driver to be behind the wheel of the vehicle.

10. The method of claim 1, wherein the plurality of vehicles are trucks.

11. The method of claim 1, wherein authorizing the autonomous operation further comprises transmitting at least one authentication key to enable secure communication between the NOC and the at least one vehicle.

12. The method of claim 1, wherein authorizing the autonomous operation further comprises transmitting at least one authentication key to enable secure communication between the lead vehicle and the one or more following vehicles.

13. A system to remotely authorize vehicle automation for one or more vehicles out of a plurality of vehicles, the vehicle automation including autonomous operation of the one or more vehicles, the system comprising:
   a network operations center (NOC) including at least one processor and associated non-volatile memory, the non-volatile memory containing instructions which, when executed, enable performance of the following:
   analyzing, at the NOC, external conditions in a vicinity of one or more of the plurality of vehicles, the external conditions being selected from the group consisting of location, time of day, road conditions, weather, and traffic; and
   responsive to the analyzing of the external conditions, authorizing, at the NOC, the autonomous operation of at least one of the plurality of vehicles;
   the authorizing enabling the at least one vehicle to engage in autonomous operation which enables forming a platoon between at least two of the plurality of vehicles, the platoon including a lead vehicle and one or more following vehicles,
   the autonomous operation comprising specifying which of the plurality of vehicles are authorized to form the platoon and which of those vehicles will be the lead vehicle and which will be the one or more following vehicles.

14. The system of claim 13, wherein the authorizing comprises transmitting one or more further data packets containing information to change one or more of the vehicles authorized to engage in autonomous operation, the time of the autonomous authorization, or the duration of the autonomous authorization.

15. The system of claim 13, wherein the non-volatile memory further contains instructions which, when executed, enable performance of the following:
   analyzing, at the NOC, internal conditions relating to the one or more of the plurality of vehicles, the internal conditions being selected from the group consisting of vehicle characteristics, vehicle position, vehicle route, vehicle destination, heading, and platooning availability; and
   wherein the authorizing, at the NOC, is responsive to the analyzing of the external and internal conditions.

16. The system of claim 13, wherein the authorizing comprises transmitting one or more further data packets containing information to change one or more of the first location or the second location.

17. The system of claim 13, wherein the road conditions comprise one or more items selected from the group consisting of road type, road geometry, road grade, road width, road conditions, road regulatory information, topography, absolute position, altitude, and altitude changes.

18. The system of claim 15, wherein vehicle characteristics comprise one or more items selected from the group consisting of vehicle weight, vehicle dimensions, vehicle type, and vehicle condition.

19. The system of claim 18, wherein vehicle condition comprises one or more items selected from the group consisting of vehicle age, mileage, brake condition, transmission condition, engine temperature, odometer reading, load information, and driver status.

20. The system of claim 19, wherein load information comprises one or more items selected from the group consisting of customer, load type, time when the load was placed in the vehicle, and length of time that the load has been on the vehicle.

21. The system of claim 19, wherein driver status comprises one or more items selected from the group consisting of driver age, length of time the driver has been behind the wheel of the vehicle, and time remaining for the driver to be behind the wheel of the vehicle.

22. The system of claim 13, wherein the plurality of vehicles are trucks.

23. The system of claim 13, wherein authorizing the autonomous operation further comprises transmitting at least one authentication key to enable secure communication between the NOC and the at least one vehicle.

24. In a system to remotely authorize vehicle automation for one or more vehicles out of a plurality of vehicles, the vehicle automation including autonomous operation of the one or more vehicles, a non-volatile memory containing instructions which, when executed, enable performance of the following:
analyzing, at a network operations center (NOC), external conditions in a vicinity of one or more of the plurality of vehicles, the external conditions being selected from the group consisting of location, time of day, road conditions, weather, and traffic; and
responsive to the analyzing of the external conditions, authorizing, at the NOC, the autonomous operation of at least one of the plurality of vehicles;
the authorizing enabling the at least one vehicle to engage in autonomous operation which enables forming a platoon between at least two of the plurality of vehicles, the platoon including a lead vehicle and one or more following vehicles,
the autonomous operation comprising specifying which of the plurality of vehicles are authorized to form the platoon and which of those vehicles will be the lead vehicle and which will be the one or more following vehicles.

25. The non-volatile memory of claim 24, wherein the plurality of vehicles are trucks.

26. The non-volatile memory of claim 24, wherein authorizing the autonomous operation further comprises transmitting at least one authentication key to enable secure communication between the NOC and the at least one vehicle.

27. The non-volatile memory of claim 24, further containing instructions which, when executed, enable performance of the following:
analyzing, at the NOC, internal conditions relating to the one or more of the plurality of vehicles, the internal conditions being selected from the group consisting of vehicle characteristics, vehicle position, vehicle route, vehicle destination, heading, and platooning availability; and
wherein the authorizing, at the NOC, is responsive to the analyzing of the external and internal conditions.

28. The system of claim 13, wherein authorizing the autonomous operation further comprises transmitting at least one authentication key to enable secure communication between the lead vehicle and the one or more following vehicles.

29. The non-volatile memory of claim 24, wherein authorizing the autonomous operation further comprises transmitting at least one authentication key to enable secure communication between the lead vehicle and the one or more following vehicles.

* * * * *